US012688645B2

(12) United States Patent
Lazri et al.

(10) Patent No.: US 12,688,645 B2
(45) Date of Patent: Jul. 21, 2026

(54) LAYER-MERGING AND POST-WARP ERROR CORRECTION IN MULTI-PLANE IMAGES

(71) Applicant: DOLBY LABORATORIES LICENSING CORPORATION

(72) Inventors: Zachary McBride Lazri, Baltimore, MD (US); Guan-Ming Su, Fremont, CA (US)

(73) Assignee: DOLBY LABORATORIES LICENSING CORPORATION

( * ) Notice: Subject to any disclaimer, the term of this patent is extended or adjusted under 35 U.S.C. 154(b) by 0 days.

(21) Appl. No.: 19/135,064

(22) PCT Filed: Nov. 29, 2023

(86) PCT No.: PCT/US2023/081664
§ 371 (c)(1),
(2) Date: Jun. 2, 2025

(87) PCT Pub. No.: WO2024/118823
PCT Pub. Date: Jun. 6, 2024

(65) Prior Publication Data
US 2026/0120391 A1     Apr. 30, 2026

Related U.S. Application Data

(60) Provisional application No. 63/429,875, filed on Dec. 2, 2022.

(51) Int. Cl.
*G06T 15/20*         (2011.01)
*G06T 3/18*          (2024.01)
(Continued)

(52) U.S. Cl.
CPC .............. *G06T 15/205* (2013.01); *G06T 3/18* (2024.01); *G06T 5/50* (2013.01); *G06T 7/11* (2017.01);
(Continued)

(58) Field of Classification Search
CPC .......... G06T 15/205; G06T 3/18; G06T 5/50; G06T 7/11; G06T 7/55; G06T 2207/20221
See application file for complete search history.

(56) References Cited

U.S. PATENT DOCUMENTS 9,609,338 B2     3/2017  Fu
10,097,820 B2    10/2018  Chen
(Continued)

FOREIGN PATENT DOCUMENTS

WO      20220152708 A1     7/2022
WO      20220152709 A1     7/2022
WO       2024006710 A1     1/2024

OTHER PUBLICATIONS

Han Yuxuan Hanyuxuan@Bit Edu CN et al: "Single-View View Synthesis in the Wild with Learned Adaptive Multiplane Images", Architectual Support for Programming Languages and Operating Systems, IEEE Computer Society Press, 10662 Los Vaqueros Circle PO Box 3014 Los Alamitos, CA 90720-1264 USA, Jul. 27, 2022 (Jul. 27, 2022), pp. 1-8.
(Continued)

*Primary Examiner* — Sarah Lhymn

(57)     ABSTRACT

A method for merging layers of multi-plane image (MPI) includes steps (1) to (5). Step (1) includes determining a layer-weight array by, for each of D1 image-layers each located at a respective one of D1 layer-depths, determining a respective total weight as an element-wise sum of a weighting-factor array of the image-layer. Step (2) includes interpolating the layer-weight array to yield an interpolated layer-weight signal. Step (3) includes partitioning the interpolated layer-weight signal into D2<D1 segments to yield D2 optimized layer-depth intervals. Step (4) includes determining, for each optimized layer-depth interval. (i) intra-interval layer-depths, of the D1 layer-depths, located within the optimized layer-depth interval; and (ii) corresponding
(Continued)

intra-interval layer weights, of the D1 total weights. Step (5) includes determining, for each of the D2 optimized layer-depth intervals, a respective output layer-depth as an average of the intra-interval layer-depths each weighted by a respective intra-interval layer weight.

12 Claims, 13 Drawing Sheets

(51) Int. Cl.
  *G06T 5/50*  (2006.01)
  *G06T 7/11*  (2017.01)
  *G06T 7/55*  (2017.01)
(52) U.S. Cl.
  CPC ...... *G06T 7/55* (2017.01); *G06T 2207/20221* (2013.01)

(56) References Cited

U.S. PATENT DOCUMENTS

| | | |
|---|---|---|
| 10,158,884 B2 | 12/2018 | Zhang |
| 10,609,394 B2 | 3/2020 | Rusert |

| | | | |
|---|---|---|---|
| 2011/0149037 A1 | 6/2011 | Van Der Horst | |
| 2020/0226816 A1* | 7/2020 | Kar | ............. G06T 7/50 |
| 2020/0228774 A1* | 7/2020 | Kar | ............. G06T 15/08 |
| 2021/0368157 A1 | 11/2021 | Overbeck | |
| 2022/0207663 A1 | 6/2022 | Carbonera Luvizon | |

OTHER PUBLICATIONS

Janus, S et al.; "Multi-Plane Image Video Compression"; 2020 IEEE 22nd International Workshop on Multimedia Signal Processing; 6 pages.

Mildenhall, Ben et al; "Local Light Field Fusion: Practical View Synthesis with Prescriptive Sampling Guidelines"; 2019; ACM Trans. Graph. 38; 4; Article 29 (Aug. 2019); 14 pages.

Sushobhan Ghosh et al; "LiveView: Dynamic Target-Centered MPI for View Synthesis", arxiv.org, Cornell University Library, 201 Olin Library Cornell University Ithaca, NY 14853, Jul. 11, 2021, XP091010947, pp. 4-5.

Tucker et al., "Single-view view synthesis with multiplane images", CVPR Jun. 2020, pp. 1-3, 3 pages.

Amidror, Isaac, "Scattered data interpolation methods for electronic imaging systems: a survey," in Journal of Electronic Imaging vol. 11, No. 2, Apr. 2002, pp. 157-176.

* cited by examiner

400

Original MPI

Convert all $A_i$ to weights

Get accumulated weights at each depth

Get piecewise linear approximation

Apply constrained Lloyd-Max algorithm

Merge layers

Layer Merged MPI

1000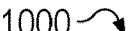

---

1010

For each image-layer of D1 image layers of a multi-plane image (MPI), determine a respective weighting-factor array of the image layer from (i) an alpha channel of the image-layer, and (ii) alpha channels of image-layers, of the D1 image-layers, having a layer-depth smaller than a layer-depth of the layer.

1012

Determine, for each pixel coordinate of the layer, a respective pixel-wise weighting factor.

---

1020

Determine a layer-weight signal.

1030

Interpolate the layer-weight signal to yield an interpolated layer-weight signal.

---

1040

Partition the interpolated layer-weight signal into D2 segments to yield D2 optimized layer-depth intervals, D2 < D1.

1041

Initialize D2 layer-depth intervals such that each of the D2 layer-depth intervals has an equal length.

1042

Determine D2 weighted depths by, for each of D2 layer-depth intervals, determining a respective one of D2 weighted depths.

1043

Updating the D2 layer-depth intervals.

1044

Obtaining the D2 optimized layer-depth intervals by iterating steps 1042 and 1044 until the plurality of lower-boundaries converge to within a predetermined tolerance.

---

1050

Determine, for each optimized layer-depth interval, (i) a number of intra-interval layer-depths and (ii) a number of intra-interval total weights each associated with a respective one of the number of intra-interval layer-depths.

---

1060     Determine, for each of the D2 optimized layer-depth intervals ...

1061 a respective output layer-depth.

1062 a respective texture channel.

1063 a respective alpha channel.

FROM FIG. 11

1200

1400

1410
Determine a plurality of warped images $N \cdot N_b \cdot D1$ in number, by, for each of the $N$ camera locations, executing step 1420, $N_b \leq (N-1)$.

1420
For $N_b$ neighboring camera locations of the $N$ camera locations other than the camera location, determining a respective sub-plurality of warped images.

1430
For each image-layer of $D1$ image-layers of the MPI dataset:

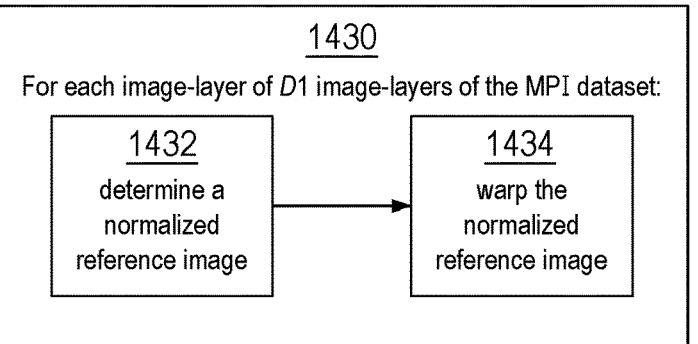

1432
determine a normalized reference image

1434
warp the normalized reference image

1440
For each of the $N$ reference images, determine $N_b$ weighted alpha-channel arrays

1210
For each image-layer of the $D1$ image-layers of each of the $N1$ images, determine a respective one of the $D1$ weighting factors from (i) an alpha channel of the image-layer, and (ii) alpha channels of image-layers, of the $D1$ image-layers, having a layer-depth smaller than a layer-depth of the layer

1460
For each pixel location of a plurality of pixel locations of the MPI dataset execute steps 1470 and 1480.

1470
Determine a coefficient array that minimizes a total warping error contributed by each of the $N$ reference images.

1480
For each image-layer of the $D1$ image-layers of each of the $N$ reference images, update the value of the texture channel of the image-layer at the pixel location by: multiplying the value of the texture channel by the element of the coefficient array corresponding to the image-layer of the reference image.

FIG. 14

LAYER-MERGING AND POST-WARP ERROR CORRECTION IN MULTI-PLANE IMAGES

CROSS-REFERENCE TO RELATED APPLICATIONS

This application is a U.S. National Stage application under U.S.C. 371 of International Application No. PCT/US2023/81664, filed on Nov. 29, 2023, which claims the benefit of priority from U.S. Provisional Patent Application No. 63/429,875 filed on Dec. 2, 2022, the contents of which are incorporated herein by reference.

BACKGROUND

A multi-plane image (MPI) scene representation is commonly used for three-dimensional (3D) scene reconstruction. This representation stores fronto-parallel planes of a scene at a discretely sampled fixed range of depths from the reference coordinate frame. Information stored in each plane contains the texture (in terms of R, G, B value) and transparency (in terms of alpha (A) channel). This structure is advantageous for synthesizing images from novel viewpoints of a scene since it can avoid occlusion-related issues typically encountered in RGB images. Common MPI-based applications require the reliable storage and communication of multi-plane images over a bitstream. It is important that reconstructed images on the decoder side of the bitstream are of high quality to ensure a satisfying user experience. However, an imperfect MPI generation source may lead to rendered images that contain visual artifacts. Moreover, the resolution constraints of a standard video codec may lead to further quality deterioration on the decoder side. A pipeline must be designed to process generated MPI data before it is fed into a bitstream to ensure that the reconstructed multi-plane images are visually appealing.

SUMMARY OF THE EMBODIMENTS

Two methods are described herein to address multiple needs of the MPI processing pipeline. The first method performs layer merging, for both single-camera and multi-camera scenario, which optimally reduces the number of MPI layers to meet the spatial resolution constrained by real-time decoding video capability in end devices. The MPI data at multiple camera locations may not be completely consistent due to warping and MPI generation error. The second method processes these MPI to mitigate this error inconsistency by modeling and constructing an optimization problem. This algorithm is useful when MPI data from multiple camera locations are fed through parallel bitstreams for 3D scene reconstruction on the decoder side.

In a first aspect, a method for merging layers of a multi-plane image (MPI) includes steps (1) to (5). Step (1) includes determining a layer-weight array by, for each image-layer of D1 image-layers of the MPI each located at a respective one of D1 layer-depths, determining a respective one of D1 total weights as an element-wise sum of a weighting-factor array of the image-layer. Step (2) includes interpolating the layer-weight array to yield an interpolated layer-weight signal. Step (3) includes partitioning the interpolated layer-weight signal into D2 segments to yield D2 optimized layer-depth intervals, D2 being less than D1. Step (4) includes determining, for each optimized layer-depth interval, (i) a number of intra-interval layer-depths, of the D1 layer-depths, located within the optimized layer-depth interval; and (ii) a number of intra-interval layer weights, of the D1 total weights, each associated with a respective one of the number of intra-interval layer-depths. Step (5) includes determining, for each of the D2 optimized layer-depth intervals, a respective output layer-depth as an average of the number of intra-interval layer-depths each weighted by a respective one of the number of intra-interval layer weights.

In a second aspect, a method for mitigating warping error of a multi-plane image (MPI) dataset is disclosed. The dataset includes N reference images of a scene each having D1 image-layers, each of the N reference images having been captured at a respective one of N camera locations. The method includes steps (1), (2), and (3).

Step (1) includes determining a plurality of warped images, $N \cdot N_b - D1$ in number, by, for each of the N camera locations: for $N_b$ neighboring camera locations of the N camera locations other than the camera location, determining a respective sub-plurality of warped images by, for each image-layer of D1 image-layers of the MPI dataset: determining a normalized reference image as an element-wise quotient of (i) of the reference image, of the N reference images, captured from the neighboring camera location and (ii) a disparity map of the reference image; and warping the normalized reference image from the neighboring camera location to the camera location. $N_b$ is less than or equal to (N–1).

Step (2) includes, for each of the N reference images, determining $N_b$ weighted alpha-channel arrays, each of which is equal to a contribution to the alpha-channel of the reference image to a respective one of the $N_b$ neighboring camera locations.

Step (3) includes, for each pixel location of a plurality of pixel locations of the MPI dataset, determine a coefficient array that minimizes a total warping error contributed by each of the N reference images, the total warping error being a function of (i) the $N_b$ weighted alpha-channel arrays. (ii) D1 weighting-factors each evaluated at the pixel location, corresponding to a respective one of the D1 image-layers of one reference image of the N reference images, and derived from alpha-channels of the one reference image, (iii) the plurality of warped images, and (iv) a texture channel of each of the N reference images, each evaluated at the pixel location; and for each image-layer of the D1 image-layers of each of the N reference images, update the value of the texture channel of the image-layer at the pixel location by: multiplying the value of the texture channel by the element of the coefficient array corresponding to the image-layer of the reference image.

BRIEF DESCRIPTION OF THE FIGURES

FIG. 10 is a flowchart illustrating a single-camera MPI layer-merging method, which may be implemented by the layer merger of FIG. 9, in an embodiment.

FIG. 14 is a flowchart illustrating a warping-error mitigation method, which may be implemented by the warping-error mitigator of FIG. 11, in an embodiment.

DETAILED DESCRIPTION OF THE EMBODIMENTS

1. Multi-Plane Imaging Overview

In this section, we first review the framework of MPI and related processing. Then, we will formulate this MPI scenario as an optimization problem. Though we introduce notation throughout this document inline, Appendix A contains a reference to all notation mentioned inside of this document.

1.1 MPI Representation

Figure 1:
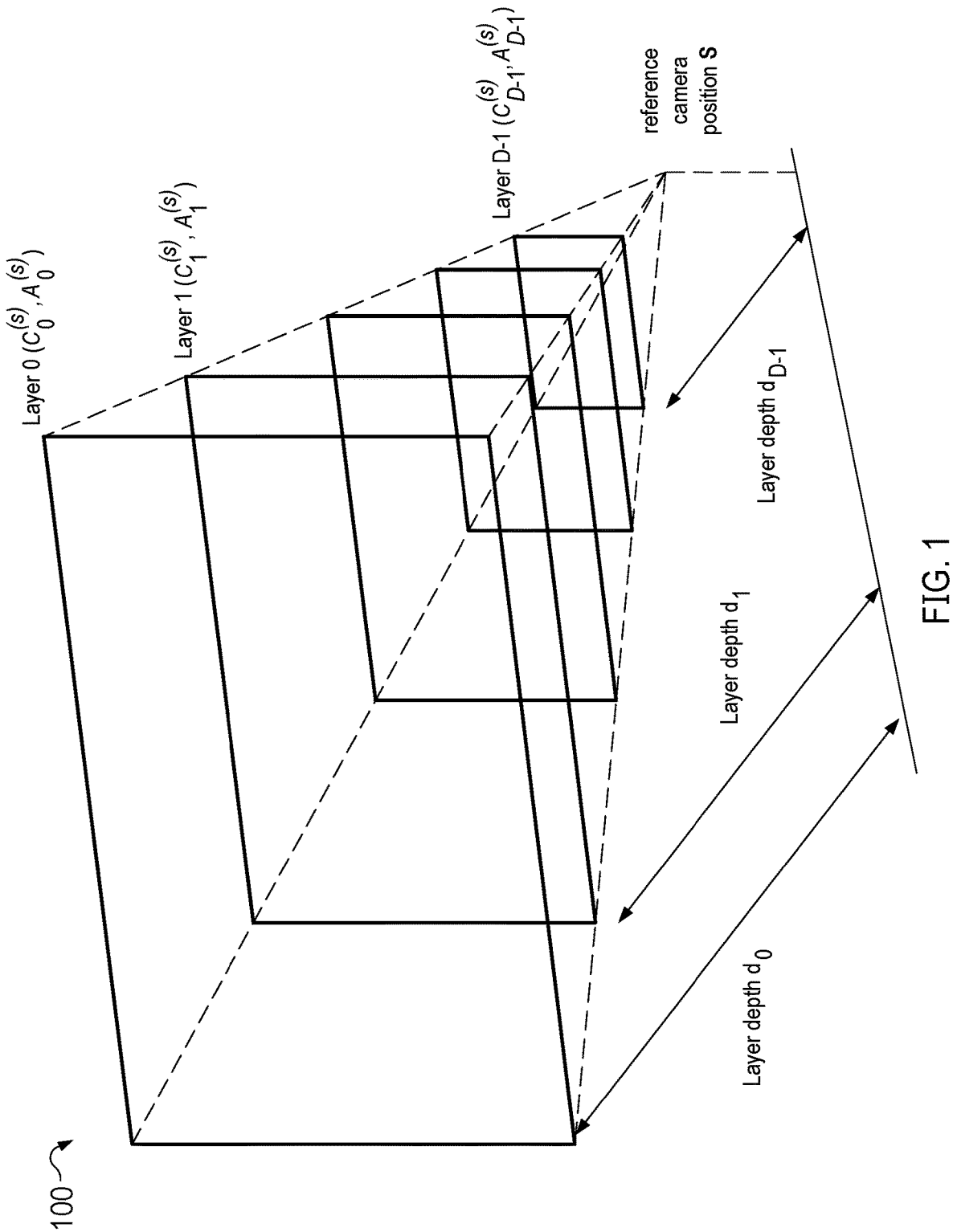
FIG. 1 is a diagram illustrating MPI 3D scene representation.

FIG. 1 is a schematic of a multi-plane image 100. MPI image 100 has D layers of images, which may be RGBA images. The most distant layer is layer 0, and layer D−1 is the one closest to reference camera position. We denote the RGB value for the $p^{th}$ layer at camera location s (e.g., a viewpoint) as $$C_p^{(s)}$$

with dimension H×W×3. The pixel value at (x, y) for color channel c is represented as $$C_p^{(s)}(x, y, c).$$

The $\alpha$ value for the $p^{th}$ layer is:

$$A_p^{(s)}$$

with dimension H×W. The pixel value at (x, y) is represented as $$C_p^{(s)}(x, y).$$

The depth distance between the $p^{th}$ layer to reference camera position is $d_p$. The image from the original reference view (without moving camera) is denoted as R, with texture pixel value R(x, y, c). Note that in MPI, the distance between two neighboring layers has fixed equal interval. Depending on the selected algorithms, given a set of multiview images or a single-view image, the algorithm will output the multi-plane image which contains $$\{(C_p^{(s)}, A_p^{(s)})$$

for P=0, . . . , D−1}.

1.2 MPI Rendering

Given one set of multi-plane images $$\{(C_p^{(s)}, A_p^{(s)})$$

for p=0, . . . , D−1}, we use it to render an image in new camera position (for virtual view). There are two main procedures for new view rendering: warping and compositing.

1.2.1 Warping

Each layer $$(C_p^{(s)}, A_p^{(s)})$$

needs to be warped from the current view point position ($v_s$) to new view point position ($v_t$).

$$C_p^{(s\to t)} = T_{v_s,v_t}(\sigma d_p, C_p)$$
$$A_p^{(s\to t)} = T_{v_s,v_t}(\sigma d_p, A_p)$$

The warping function, $T_{v_s,v_t}$( ) is represented as $$\begin{bmatrix} u_s \\ v_s \\ 1 \end{bmatrix} = K_s\left(R - \frac{tn^T}{a}\right)(K_t)^{-1}\begin{bmatrix} u_t \\ v_t \\ 1 \end{bmatrix} \quad (2)$$

where $v_s=(u_s, v_s)$ and $v_t=(u_t, v_t)$. $K_s$ and $K_t$ are the intrinsic camera model for reference view and target view, respectively. R and t are the extrinsic camera model for rotation and translation. n is the normal vector $[0\ 0\ 1]^T$, a is the distance to a plane that is fronto-parallel to the source camera at depth $\sigma d_p$.

1.2.2 Compositing

We can render the new view from those warped texture and alpha images via the following equations.

$$W_p^{(s\to t)} = \left(A_p^{(s\to t)} \cdot \Pi_{j=p+1}^{D-1}(1 - A_j^{(s\to t)})\right) \quad (3)$$
$$I^{(s\to t)} = \Sigma_{p=0}^{D-1} C_p^{(s\to t)} W_p^{(s\to t)} \quad (4)$$

The disparity map in the source view can be computed as:

$$W_p^{(s\to t)} = A_p^{(s\to t)} \cdot \Pi_{j=p+1}^{D-1}(1 - A_j^{(s\to t)}) \quad (5)$$
$$D^{(s\to t)} = \Sigma_{p=0}^{D-1} d_p^{-1} W_p^{(s\to t)} \quad (6)$$

We can also render the view at the original reference camera position. In this case, the warping process can be skipped, and the weighting factor can be computed as $$W_p^{(s)} = A_p^{(s)} \cdot \Pi_{j=p+1}^{D-1} \left(1 - A^{(s)}\right) \tag{7}$$

$$I^{(s)} = \Sigma_{p=0}^{D-1} C_p^{(s)} W_p^{(s)} \tag{8}$$

To facilitate the discussion, we denote the conversion from alpha channel to weighting factor as the following function.

---

Function: $\{W_p\}$ = alpha_to_weight($\{A_p\}$)

Input: alpha $\{A_p\}$

Output: weighting factor $\{W_p\}$ step-1: compute weighting factor from alpha value for all D layers $$W_p(x, y) = A_p \cdot \prod_{j=p+1}^{D-1} (1 - A_j(x, y))$$

---

We further denote the rendering process as the following function:

---

Function: I = reference_view_rendering($\{A_p\}$, $\{C_p\}$)

Input: alpha $\{A_p\}$ and texture $\{C_p\}$

Output: rendered image I step-1: compute weighting factor from alpha value for all D layers $\{W_p\}$ = alpha_to_weight($\{A_p\}$)

step-2: linear combining all textures with weighting factor.

$$I = \sum_{p=0}^{D-1} C_p W_p$$

Note that if the weighting factor is known already, the first step can be skipped.

---

2. Multi-Plane Image Layer Merging

In this section, the layer merging problem is formulated and multiple approaches to solving the problem are considered. The motivation for this problem comes from the fact that originally generated multi-plane images require storage capacity larger than can be stored by technology currently in the market. A generated MPI may consist of D depth layers, where a typical value of D is 32 and a typical resolution of each depth image is 1080p. For these specifications, restructuring the depth information MPI would require storage of a 16 k resolution image, a resolution much higher than what is currently supported by most market products. The task of this module is to do layer merging to reduce the number of layers according to a device's support capability. It is important to do so in a way that maintains the quality of the MPI as much as possible.

There are two versions of the problem that are considered: (1) the single camera transmission scenario and (2) the multiple camera transmission scenario. In the single camera transmission scenario, only one MPI is fed through a bitstream. The goal for this situation is to optimally merge the layers of the original MPI such that the quality of this MPI after local warping is preserved. In the multiple camera transmission scenario, multiple MPIs captured in different camera positions will be encoded as a compressed bitstream. The information in these MPIs is jointly used to generate global novel views between the original camera positions.

2.1 Problem Formulation

2.1.1 Single Camera Problem Formulation

Let $$\left\{\left(C_p^{(s)}, A_p^{(s)}\right)\right.$$

for p=0, . . . , D−1} be the original multi-plane image provided by the MPI generation source. Let D'<D, representing the number of output layers we need to have after layer merging has been applied. Let $$\left\{\left(C_{p'}^{\prime(s)}, A_{p'}^{\prime(s)}\right)\right.$$

for p'=0, . . . , D'−1} represent the multi-plane images obtained through layer merging. Let t be an arbitrary novel view to be warped to. Then the goal of layer merging in the single camera problem formulation is to solve the following minimization problem.

$$\left\{C_{p'}^{\prime(s)opt}, A_{p'}^{\prime(s)opt}, d'_{p'}\right\} = \min_{\left\{C_{p'}^{\prime(s)}, A_{p'}^{\prime(s)}, d'_{p'}\right\}} \sum_t \left\|I^{(s \to t)} - I^{\prime(s \to t)}\right\|^2, \forall t \tag{9}$$

In plain language, this problem states that we want to merge the MPI layers in such a way that when we warp the layer-merged MPI to any novel view position, the result rendered image should resemble the image rendered by the original MPI that was warped to this position. Directly solving this optimization problem is computationally infeasible given the infinite number of novel poses, t, that would need be tested. We provide two solutions to this problem.

2.1.2 Naïve Solution to Single Camera Problem

The first proposed solution to this problem works by simply merging consecutive groups of adjacent layers together. Since it does not take depth information into account in trying to solve the problem, we refer to this solution as the "Naïve Method".

Let D'<D be a number such that mod(D, D')=0. Moreoover, let $$M = \frac{D}{D'}$$

Then, this proposed solution is given by:

$$C_{p'}^{\prime(s)} = \frac{\Sigma_{j=M*p'}^{M*(p'+1)-1} C_j^{(s)}}{M} \tag{10}$$

$$A_{p'}^{\prime(s)} = \frac{\Sigma_{j=M*p'}^{M*(p'+1)-1} A_j^{(s)}}{M}$$

$$d'_{p'} = \frac{\Sigma_{j=M*p'}^{M*(p'+1)-1} d_j}{M}$$

This solution effectively works by uniformly interpolating the originally sampled depths. Aside from not taking depth information into account when merging consecutive layers, this method also has the drawback of requiring that the number of layers that number of merged layers must be a factor of D. However, in many cases we may wish to fractionally downsample the number of layers. To address these both drawbacks we provide a second solution to this problem in the next subsection.

---

Function: $\left\{\left\{A_{p'}^{\prime(s)}\right\}, \left\{C_{p'}^{\prime(s)}\right\}, \left\{d_{p'}'\right\},\right\}$ = single_camera_naive $\left(\left\{A_p^{(s)}\right\}, \left\{C_p^{(s)}\right\}, \{d_p\}, D'\right)$ Input: alpha $\left\{A_p^{(s)}\right\}$ texture $\left\{C_p^{(s)}\right\}$, depth $\{d_p\}$, number of output depths $D'$ Output: Layer-merged alpha $\left\{A_{p'}^{\prime(s)}\right\}$ texture $\left\{C_{p'}^{\prime(s)}\right\}$, and depth $\{d_{p'}'\}$, step-1: For each new depth, p' = 0, ... , D' − 1, calculate the texture calculate the texture, alpha, and depth position.

$$C_{p'}^{\prime(s)} = \frac{\sum_{j=M*p'}^{M*(p'+1)-1} C_j^{(s)}}{M}$$

$$A_{p'}^{\prime(s)} = \frac{\sum_{j=M*p'}^{M*(p'+1)-1} A_j^{(s)}}{M}$$

$$d_{p'}' = \frac{\sum_{j=M*p'}^{M*(p'+1)-1} d_j}{M}.$$

---

2.1.2 Interpolation Solution to Single Camera Problem

To address the draw backs of the Naïve Method for layer merging, we have devised a method that uses constrained optimization to select the optimal depth locations for the merged layers to appear and which layers should be merged to construct the output layers at these depth locations. This method uses interpolation to merge the layers together. Hence, we call this solution the "Interpolation Method."

Figures 2, 3:
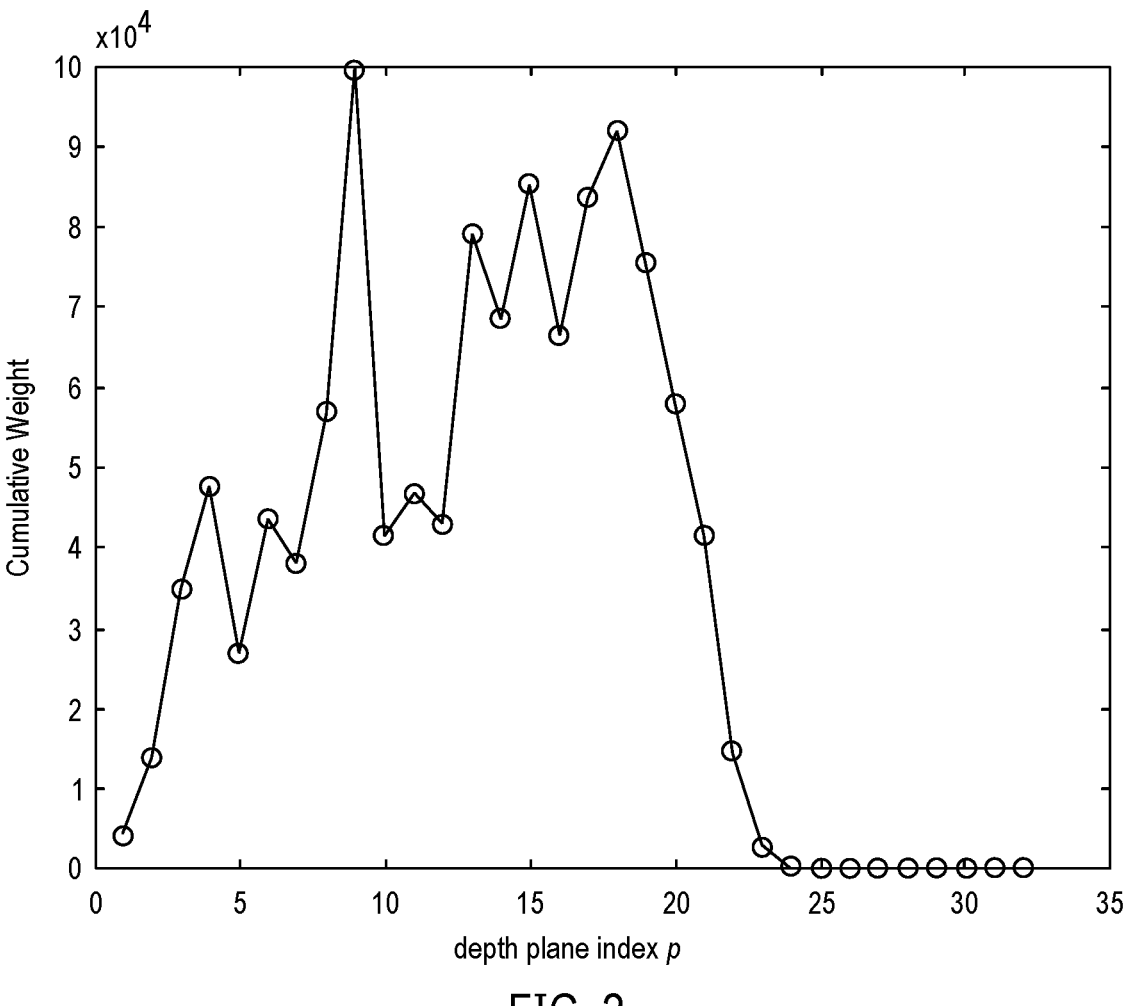
FIG. 2 is an example plot of a weighting factor as a function of depth for an example multi-plane image.
FIG. 3 is a graphical illustration of how partition intervals are used to perform layer merging in a multi-plane image, in an embodiment.

Each of the original MPI layers contains different amounts of information in their weighting factors, and it is common for the amounts of information present in each to vary considerably. An example of this is shown in FIG. 2, which is plot of an interpolated layer-weight signal $q^{(s)}(z)$ defined in equations (11) and (12). The total weighting factor information inside each of the original 32 layers of the multi-plane image are given by the open-circle points. In the example of FIG. 2, layers 15 to 20 of the MPI contain a significant amount of accumulated weight, whereas layers 25 to 32 contain very little accumulated weight. Intuitively, it is more important to preserve the quality of layers containing more information in their weighting factors than those that contain little since layers containing more weighting information contribute more information to the final rendered image. This observation motivates the following solution.

We can obtain the accumulated weight contributed to the weighting factor at depth p according to the following equation, where $a^{(s)}(p)$ is a "layer weight" of layer p.

$$a^{(s)}(p) = \sum_{x=0}^{H-1} \sum_{y=0}^{W-1} W_p^{(s)}(x, y). \tag{11}$$

We convert layer weight $a^{(s)}$ into a continuous piecewise linear signal $q^{(s)}$ by performing linear interpolation to fill the samples between points in layer weight $a^{(s)}$ as follows. For any point z that falls between two depths $d_{p-1}$ and $d_p$, $q^{(s)}$ may be expressed by equation (12). While equation (12) employs linear interpolation, other types of interpolation may be used without departing from the scope hereof.

$$q^{(s)}(z) = a^{(s)}(d_{p-1}) + \left[z - a^{(s)}(d_{p-1})\right] \frac{a^{(s)}(d_p) - a^{(s)}(d_{p-1})}{d_p - d_{p-1}}. \tag{12}$$

Our goal then becomes optimally partitioning $q^{(s)}$ into D' segments, which will be used to generate the output layer-merged MPI. To do this, we use a constrained formulation of the Lloyd-Max quantizer. Let $t_0$, . . . , $t_{D'}$ represent the partition boundaries of $q^{(s)}$ and $r_0$, . . . , $r_{D'-1}$ represent the optimal reconstruction levels of the quantized version of $q^{(s)}$, which we denote as $q'^{(s)}$. The original formulation of the Lloyd-Max quantizer is solved by minimizing the following cost function:

$$J = E\left[\left(q^{(s)} - q'^{(s)}\right)^2\right] = \sum_{p'=0}^{D'-1} \int_{t_{p'}}^{t_{p'+1}} (z - r_{p'})^2 q^{(s)}(z) dz \tag{13}$$

This cost function states that if we wish to quantize $q^{(s)}$ using D' reconstruction levels, we should penalize under-sampled regions of $q^{(s)}$ with large total weight. By partially differentiating with respect to $\{t_{p'}\}$ and $\{r_{p'}\}$, we can obtain the necessary conditions of the optimal solution:

$$\begin{cases} t_{p'} = \dfrac{r_{p'} + r_{p'+1}}{2} \\[2mm] r_{p'} = \dfrac{\displaystyle\int_{t_{p'}}^{t_{p'+1}} z q^{(2)}(z) dz}{\displaystyle\int_{t_{p'}}^{t_{p'+1}} q^{(2)}(z) dz} \end{cases} \tag{14}$$

A solution that satisfies these conditions can be implemented iteratively by alternating to update the reconstruction levels. $\{r_{p'}\}$, and partition levels, $\{t_{p'}\}$.

The problem with this solution is that it does not guarantee that every partition interval contains a depth layer of the original MPI inside of it. That is, some partition intervals may be left empty according to this formulation, which is wasteful. Thus, we modify this problem in a constrained form that guarantees that each partition interval contains at least one of the original MPI depths inside of it. Observing that the distance between each of the originally generated camera depths is constant is given by a constant, $d = d_p d_{p-1}$, $\forall p$, imposing the constraints that $t_{p'} - t_{p'-1} > d$, $\forall p'$ will ensure that every partition interval contains at least information from one layer of the original MPI inside of it. We can incorporate these constraints in the form of hard constraints in the Lloyd-Max objective function as follows:

$$J = E\left[(q'^{(s)} - q^{(s)})^2\right] = \sum_{p'=0}^{D'-1} \int_{t_{p'}}^{t_{p'+1}} (z - r_{p'})^2 q^{(s)}(z) dz + \underline{1}^T \chi_+ (Dt - d), \tag{15}$$

where $$D = \begin{pmatrix} -1, 1 & \cdots & 0, 0 \\ \vdots & \ddots & \vdots \\ 0, 0 & \cdots & -1, 1 \end{pmatrix}, t = \begin{pmatrix} t_0 \\ \cdots \\ t_{D'} \end{pmatrix}, \text{ and } d = \begin{pmatrix} d \\ \cdots \\ d \end{pmatrix}. \tag{16}$$

$\chi_+$ represents the positive characteristic function, which shoots to infinity if any of our constraints are violated and is equal to 0 otherwise. Specifically, $$\chi_+(n) = \begin{cases} \infty, \text{ if } n < 0 \\ 0, \text{ otherwise} \end{cases}. \tag{17}$$

Because the new term in our cost function does not depend on the reconstruction levels, the optimality condition for the reconstruction levels remains unchanged. On the other hand, the cost function will shoot to infinity if any of the partition intervals become too small. Consequently, if modifying a partition level were to cause any partition intervals to become too small, it would be optimal to leave this partition level unchanged. If modifying a partition level does not violate the constraint, the second term in the cost function becomes 0 and it is optimal to update the partition interval according to the previous optimality condition. Putting this all together, we have the following optimality conditions for our constrained Lloyd-Max problem:

$$\begin{cases} t_{p'} = \begin{cases} R, \text{ if } R - t_{p'-1} - d \geq 0 \text{ and } t_{p'+1} - R - d \geq 0 \\ t_p, \text{ otherwise} \end{cases} \\ r_{p'} = \int_{t_{p'}}^{t_{p'+1}} = z \ q^{(s)}(z) dz \Big/ \int_{t_{p'}}^{t_{p'+1}} q^{(s)}(z) dz \end{cases}, \tag{18}$$

where $$R = \frac{r_{p'} + r_{p'+1}}{2}.$$

The function to implement this iterative process is provided below.

---

Function: $\{\{r_{p'}\}, \{t_{p'}\}\}$= constrained_Lloyd_Max($q^{(s)}$, D')
Input: one dimensional signal $q^{(s)}$ and number of output depths D'
Output: Reconstruction levels, $\{r_{p'}\}$ and partition levels $\{t_{p'}\}$.
step-1: Initialize $\{t_{p'}\}$ to be uniformly distributed.

step-2: Update $\{r_{p'}\}$ using the equation $r_{p'} = \dfrac{\int_{t_{p'}}^{t_{p'+1}} zq^{(s)}(z)dz}{\int_{t_{p'}}^{t_{p'+1}} q^{(s)}(z)dz} \forall k$ step-3: Update $\{t_{p'}\}$ in a for loop as follows:
For p' = 1, ... , D' − 1
$t_{p'} = \begin{cases} R, \text{ if } R - t_{p'-1} - d \geq 0 \text{ and } t_{p'+1} - R - d \geq 0 \\ t_p, \text{ otherwise} \end{cases},$

--- where $R = \dfrac{r_{p'} + r_{p'+1}}{2}$ end step-4: Alternate between step-2 and step-3 until convergence.

---

So far, we have discussed how to determine the partition intervals for layer merging, but we have not addressed how to actually generate the layer-merged MPI information. We now explain this. An arbitrary partition interval $[t_{p'-1}, t_{p'})$ contains the following MPI layer information:

$$\{(C_j^{(s)}, A_j^{(s)}, d_j)\}$$

for $j = p_{min}(p'), \ldots, p_{max}(p')\}$. Here $p_{min}(p')$ and $p_{max}(p')$ are such that $d_{pmin(p')}$ is the smallest value of $d_p$ greater than or equal to lower limit $t_{p'-1}$, and $d_{pmax\ (p')}$ is the largest value of $d_p$ less than upper limit $t_{p'}$. We update this information according to the following formulas:

$$d'_{p'} = \frac{\sum_{j=p_{min}(p')}^{p_{max}(p')} a^{(s)}(j) d_j}{\sum_{j=p_{min}(p')}^{p_{max}(p')} a^{(s)}(j)} \tag{19a}$$

$$C'^{(s)}_{p'} = \frac{\sum_{j=p_{min}(p')}^{p_{max}(p')} a^{(s)}(j) C_j^{(s)}}{\sum_{j=p_{min}(p')}^{p_{max}(p')} a^{(s)}(j)} \tag{19b}$$

$$A'^{(s)}_{p'} = \frac{\sum_{j=p_{min}(p')}^{p_{max}(p')} a^{(s)}(j) A_j^{(s)}}{\sum_{j=p_{min}(p')}^{p_{max}(p')} a^{(s)}(j)} \tag{19c}$$

An illustration of this process is presented in FIG. 3, which illustrates of how the partition intervals are used to perform layer merge. The squares represent partition levels. The locations of the samples of layer weight $a^{(s)}$ between two partition levels, are used to determine the locations of the newly sampled depths $\{d'_{p'}\}$. In this example the original MPI contains 8 layers. The total weight for each layer, $a^{(s)}$, is given by the 8 dark-gray circular points in the plot. We interpolate these 8 points to obtain a piecewise linear continuous approximation of the accumulated depth information in this MPI, given by the curve, $q^{(s)}$. After obtaining $q^{(s)}$, we perform constrained Lloyd-Max optimization. The output depths, $\{d'_{p'}\}$, and partition levels, $\{t_{p'}\}$, are represented by the light gray circles and squares, respectively. We can observe that between every two consecutive partition levels, there always exists a value of layer weight $a^{(s)}$, meaning that not partition level is left empty. We use the MPI depth information inside each of these partition levels to perform layer merging. Thus, each partition level outputs one layer of the output MPI.

Figure 4:
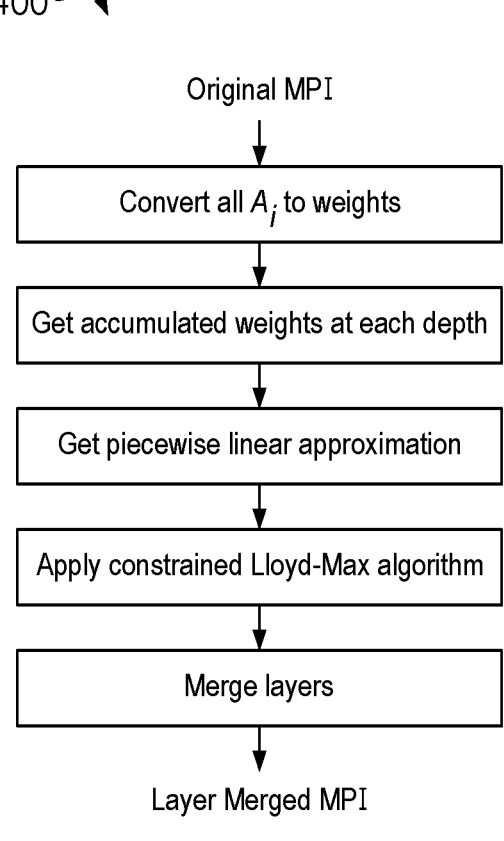
FIG. 4 is a flowchart illustrating a method for merging layers of a multi-layer image, in an embodiment.

FIG. 4 is a flowchart illustrating a method 400 for merging layers of a multilayer image. Method 400 employs a function single_camera_interpolation described below.

Function: $\{\{A'^{(s)}_{p'}\}, \{C'^{(s)}_{p'}\}, \{d'_{p'}\}\} = \text{single\_camera\_interpolation}(\{A^{(s)}_p\}, \{C^{(s)}_p\}, \{d_p\})$ Input: alpha $\{A^{(s)}_p\}$ texture $\{C^{(s)}_p\}$, and depth $\{d_p\}$ Output: Layer-merged alpha $\{A'^{(s)}_{p'}\}$ texture $\{C'^{(s)}_{p'}\}$, and depth $\{d'_{p'}\}$, step-1: compute weighting factor from alpha value for all D layers $$\{W^{(s)}_p\} = \text{alpha\_to\_weight}(\{A^{(s)}_p\})$$

step-2: compute accumulated weight at each depth $$a^{(s)}(p) = \sum_{x=0}^{H-1} \sum_{y=0}^{W-1} W^{(s)}_p(x, y).$$

step-3: compute piecewise linear approximation of accumulated weight signal.

$$q^{(s)}(z) = a^{(s)}(d_{p-1}) + \left[z - a^{(s)}(d_{p-1})\right] \frac{a^{(s)}(d_p) - a^{(s)}(d_{p-1})}{d_p - d_{p-1}}.$$

step-4: Apply $\{\{r_{p'}\}, \{t_{p'}\}\} = \text{constrained\_Lloyd\_Max}(q^{(s)}, D')$
step-5: Apply merging to obtain $\{\{A'^{(s)}_{p'}\}, \{C'^{(s)}_{p'}\}, \{d'_{p'}\}\}$ using $\{t_{p'}\}$.

For p' = 1, ... , D'
Select partition interval $[t_{p'-1}, t_{p'})$.
Get texture, alpha, and depth information whose depths fall inside $[t_{p'-1}, t_{p'})$
$\{(C^{(s)}_j, A^{(s)}_j, d_j)$ for $j = p\text{min}(p'), ... , p\text{max}(p')\}$
Get texture, alpha, and depth information layer p in layer-merged MPI $$C'^{(s)}_{p'} = \frac{\sum_{j=p\text{min}(p')}^{p\text{max}(p')} a^{(s)}(j)C^{(s)}_j}{\sum_{j=p\text{min}(p')}^{p\text{max}(p')} a^{(s)}(j)}$$

$$A'^{(s)}_{p'} = \frac{\sum_{j=p\text{min}(p')}^{p\text{max}(p')} a^{(s)}(j)A^{(s)}_j}{\sum_{j=p\text{min}(p')}^{p\text{max}(p')} a^{(s)}(j)}$$

$$d'_{p'} = \frac{\sum_{j=p\text{min}(p')}^{p\text{max}(p')} a^{(s)}(j)d_j}{\sum_{j=p\text{min}(p')}^{p\text{max}(p')} a^{(s)}(j)}$$

End

2.1.3 Full Single Camera Layer Merging Processing Pipeline

Figures 5, 6:
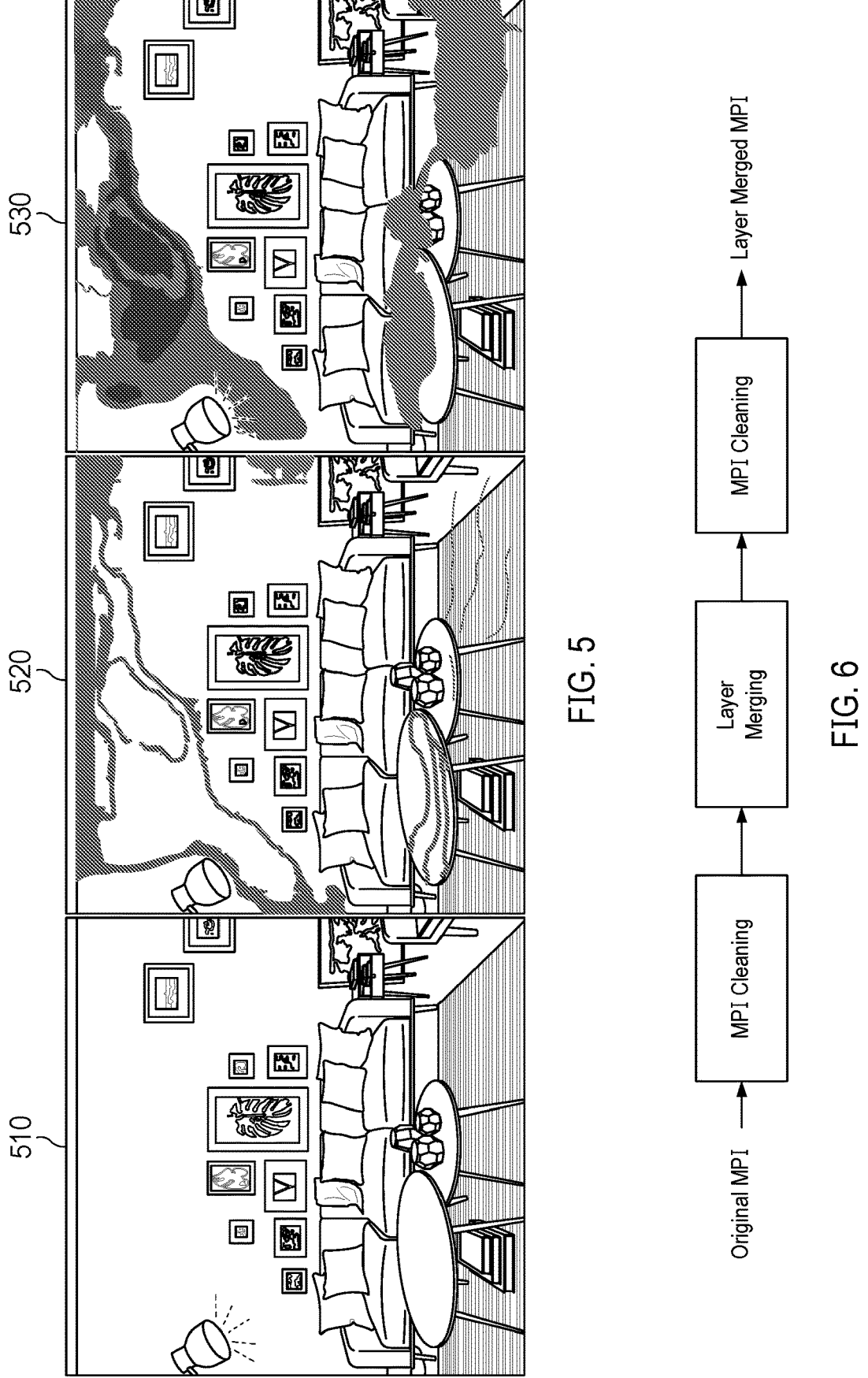
FIG. 5 depicts images that illustrate artifacts incurred when cleaning is not applied before and after layer merging.
FIG. 6 is a flowchart illustrating a full layer merging processing pipeline in a single camera scenario, in an embodiment.

The direct application of layer merging without any pre- or post-processing will cause significant artifacts to appear in the rendered multi-plane image irrespective of which layer merging approach is used. Examples of such artifacts can be seen when comparing the naïve and interpolation methods to a reference image 510 of FIG. 5. FIG. 5 illustrates artifacts incurred when cleaning is not applied before and after layer merging. FIG. 5 includes reference image 510, a layer-merged image 520 rendered with naïve layer merging, and a rendered image 530 rendered with interpolation. Thus, MPI cleaning is performed before and after layer merging to resolve these issues. FIG. 6 is a flowchart 600 illustrating full layer merging processing pipeline in the single camera scenario.

2.1.4 Multiple Camera Problem Formulation

As previously mentioned, we may wish to transmit multiple MPIs and use them to collectively construct global novel views of a scene. We formulate the problem setup for this scenario in this section.

Let $$\{(C^{(s)}_p, A^{(s)}_p)$$

for $$p = 0, ... , D-1\}_{s=0}^{N-1}$$

be the original set of multi-plane images provided by the MPI generation source at N camera locations. Let D'<D, representing the number of output depths we need to have after layer merging has been applied to each MPI. Let $$((C'^{(s)}_{p'}, A'^{(s)}_{p'})$$

for $$p' = 0, \ldots, D' - 1\}_{s=0}^{N-1}$$

represent the multi-plane images obtained through layer merging. Let t be an arbitrary novel view to be warped to. Let $T_t$ be the set of all neighboring cameras of position t. Camera s' rendered image and alpha channel at the novel view position are respectively given by $$I^{(s \to t)} = \sum_{p=0}^{D-1} C_p^{(s \to t)} W_p^{(s \to t)}$$

and $$A^{(s \to t)} = \sum_{p=0}^{D-1} A_p^{(s \to t)}$$

in the original MPI case and $$I'^{(s \to t)} = \sum_{p'=0}^{D'-1} C_{p'}^{(s \to t)} W_{p'}'^{(s \to t)} \text{ and } A'^{(s \to t)} = \sum_{p'=0}^{D'-1} A_{p'}'^{(s \to t)}$$

in the layer-merged MPI case. Suppose a weighted average is taken of the rendered images of all cameras at the novel view position to obtain the final RGB for both the original and layer-merged MPI cases, Specifically, the output rendered RGB images produced by the original and layer merged MPI at the novel view position are given by the following equations, respectively:

$$\bar{I}^{(t)} = \frac{\sum_{s \in T_t} \alpha^{(s \to t)} A^{(s \to t)} I^{(s \to t)}}{\sum_{s \in T_t} \alpha^{(s \to t)} A^{(s \to t)}} \quad (19)$$

$$\bar{I}'^{(t)} = \frac{\sum_{s \in T_t} \alpha'^{(s \to t)} A'^{(s \to t)} I'^{(s \to t)}}{\sum_{s \in T_t} \alpha'^{(s \to t)} A'^{(s \to t)}}, \quad (20)$$

where $\alpha^{(s \to t)}$ and $\alpha'^{(s \to t)}$ weights the contribution of an image captured by cameras to the novel view t according to the distance between the camera s and the novel view t. Specifically, $$\alpha^{(s \to t)} = e^{-\frac{f}{Dd_{min}} \|p_s - p_t\|_2} \quad (21)$$

$$\alpha^{(s \to t)} = e^{-\frac{f}{Dd'_{min}} \|p_s - p_t\|_2}, \quad (22)$$

where f represents the camera focal length, and $p_s$ and $p_t$ represent the poses of camera s and the novel view t. Also in eqs. (21) and (22), $d_{min}$ is the distance $d_p$ where $p=(D-1)$, and $$d'_{min}$$

is the distance $$d'_p$$

where p=(D'−1). These equations are based on Equation 8 of Mildenhall et al. [2]. For brevity, we use the notation, $B^{(s \to t)}$, to represent the following weighting factors:

$$B^{(s \to t)} = \frac{\alpha^{(s \to t)} A'^{(s \to t)}}{\sum_{l \in T_t} \alpha^{(l \to t)} A'^{(l \to t)}} \quad (23)$$

$$B'^{(s \to t)} = \frac{\alpha'^{(s \to t)} A'^{(s \to t)}}{\sum_{l \in T_t} \alpha'^{(l \to t)} A'^{(l \to t)}}$$

Then the goal of layer merging in the multiple camera problem formulation is to solve the following minimization problem.

$$\{C_{p'}'^{(s)opt}, A_{p'}'^{(s)opt}, d_{p'}'^{opt}\}_{s=0}^{N-1} = \min_{\{C_{p'}'^{(s)}, A_{p'}'^{(s)}, d_{p'}'\}_{s=0}^{N-1}} \sum_t \|\bar{I}^{(t)} - \bar{I}'^{(t)}\|^2, \forall t \quad (24)$$

In plain language, this problem states that we want to merge the MPI layers in such a way that when we combine them to generate a rendered image at a novel view, the resulting rendered image should resemble the image generated by the original MPIs. Directly solving this optimization problem is computationally infeasible given the infinite number of novel poses, t, that would need be tested. Thus, we provide two solutions to this problem using insights of the problem. Since these solutions are generalizations of the single camera algorithms that were presented in the last two sections, we only devote one section to their formulation and discussion.

2.1.5 Multiple Camera layer Merging Solutions: Naïve and Interpolation

The key to the solutions proposed in the multiple camera situation is ensuring depth consistency across cameras as we perform layer merging. Specifically, for all cameras s=0, . . . , N−1 the output merged MPI layers are positioned with the same depth spacing, $\{d'_{p'}\}$.

The Naïve Method is easily extended from single camera to multi-camera scenario. When each camera originally has the same depths $\{d_p\}$, applying the following equation.

$$d'_{p'} = \frac{\sum_{j=M+p'}^{M*(p'+1)-1} d_j}{M} \quad (25)$$

from the single camera Naïve Method will lead to the same output depths $\{d'_{p'}\}$ for each camera. Therefore, the multi-camera solution for the Naïve Method is given by the following equations:

$$C_{p'}'^{(s)} = \frac{\sum_{j=M+p'}^{M*(p'+1)-1} C_j^{(s)}}{M} \quad (26)$$

$$A_{p'}'^{(s)} = \frac{\sum_{j=M+p'}^{M*(p'+1)-1} A_j^{(s)}}{M}$$

-continued $$d'_{p'} = \frac{\sum_{j=M+p'}^{M*(p'+1)-1} d_j}{M}$$

$$\forall s.$$

(5)

---

Function: $\left\{ \left\{ C''^{(s)}_{p'} \right\}, \left\{ A'^{(s)}_{p'} \right\}, \left\{ d'_{p'} \right\} \text{ for } p' = 0, \ldots, D' - 1 \right\}_{s=0}^{N-1} =$ multi_camera_naive$\left( \left\{ \left\{ C^{(s)}_p \right\}, \left\{ A^{(s)}_p \right\}, \left\{ d_p \right\} \text{ for } p = 0, \ldots, D - 1 \right\}_{s=0}^{N-1}, D' \right)$ Input: $\left\{ \left\{ C^{(s)}_p \right\}, \left\{ A^{(s)}_p \right\}, \left\{ d_p \right\} \text{ for } p = 0, \ldots, D - 1 \right\}_{s=0}^{N-1}$ alpha, texture, and depth for all $N$
cameras and number of output depths D'.
Output: Layer-merged alpha, texture, and depth for all N cameras.

$$\left\{ \left\{ C''^{(s)}_{p'} \right\}, \left\{ A'^{(s)}_{p'} \right\}, \left\{ d'_{p'} \right\} \text{ for } p' = 0, \ldots, D - 1 \right\}_{s=0}^{N-1}$$

step-1: For each camera, apply single camera layer merging to calculate the texture,
alpha, and depth position.
for s = 0 to N- 1

$$\left\{ \left\{ A'^{(s)}_{p'} \right\}, \left\{ C''^{(s)}_{p'} \right\}, \left\{ d'_{p'} \right\}, \right\} = \text{single\_camera\_naive}\left( \left\{ A^{(s)}_p \right\}, \left\{ C^{(s)}_p \right\}, \left\{ d_p \right\}, D' \right)$$

End

---

Conversely, directly applying the single camera Interpolation Method to each of the cameras will not produce the same set of depths $\{d'_p\}$ for each camera. This is because, the choice in output depths provided for a single camera depends on the accumulated weight information in each layer's weighting factor, which may be different for each camera. Specifically, $q^{(s)}$ may vary depending on s. To remedy this problem, we select one global accumulated weighting signal, q, which will be used to obtain the output set of depths $\{d'_p\}$ used for all the camera locations according to equation (27).

$$q(z) = \sum_{s=0}^{N-1} q^{(s)}(z). \tag{27}$$

q represents the accumulation of weight over all cameras. This means that the weighting factors at each depth (and for each camera) will be considered when the constrained Lloyd-Max optimizer decides how to create the unified depth partitioning. The outline of the algorithm is provided in the function, multi_camera_interpolation, with the key step change of replacing $q^{(s)}$ with q in step-5 below.

---

Function: $\left\{ \left\{ C''^{(s)}_{p'} \right\}, \left\{ A'^{(s)}_{p'} \right\}, \left\{ d'_{p'} \right\} \text{ for } p' = 0, \ldots, D - 1 \right\}_{s=0}^{N-1} =$ multi_camera_interpolation$\left( \left\{ \left\{ C^{(s)}_p \right\}, \left\{ A^{(s)}_p \right\}, \left\{ d_p \right\} \text{ for } p = 0, \ldots, D - 1 \right\}_{s=0}^{N-1}, D' \right)$ Input: $\left\{ \left\{ C^{(s)}_p \right\}, \left\{ A^{(s)}_p \right\}, \left\{ d_p \right\} \text{ for } p = 0, \ldots, D - 1 \right\}_{s=0}^{N-1}$ alpha, texture, and depth for all $N$
cameras and number of output depths D'.
Output: Layer-merged alpha, texture, and depth for all N cameras.

$$\left\{ \left\{ C''^{(s)}_{p'} \right\}, \left\{ A'^{(s)}_{p'} \right\}, \left\{ d'_{p'} \right\} \text{ for } p' = 0, \ldots, D - 1 \right\}_{s=0}^{N-1}$$

step-1: for all s, compute weighting factor from alpha value for all D layers $$\left\{ W^{(s)}_p \right\} = \text{alpha\_to\_weight}\left( \left\{ A^{(s)}_p \right\} \right)$$

step-2: for all s compute accumulated weight at each depth $$a^{(s)}(p) = \sum_{x=0}^{H-1}\sum_{y=0}^{W-1} W_p^{(s)}(x, y).$$

step-3: for all s, compute piecewise linear approximation of accumulated weight signal.

$$q^{(s)}(z) = a^{(s)}(d_{p-1}) + \left[z - a^{(s)}(d_{p-1})\right]\frac{a^{(s)}(d_p) - a^{(s)}(d_{p-1})}{d_p - d_{p-1}}.$$

step-4: obtain global accumulated weighting signal, q, $$q(z) = \sum_{s=0}^{N-1} q^{(s)}(z).$$

step-5: apply step-4 of single_camera_interpolation function, but replace $q^{(s)}$ with q.
step-6: for all $s$ merging to obtain $\left\{\left\{A_{p'}^{\prime(s)}\right\}, \left\{C_{p'}^{\prime(s)}\right\}, \left\{d_{p'}'\right\}\right\}$ using $\{t_{p'}\}$.

For p' = 1 to D'
Select partition interval $[t_{p'-1}, t_{p'})$.
Get texture alpha and depth information whose depths fall inside $[t_{p'-1}, t_{p'})$
$\left\{(C_p^{(s)}, A_p^{(s)}, d_p)\right\}$ for $j = p\min(p'), \ldots, p\max(p')$ for all $s$.

Get texture, alpha, and depth information layer p in the layer-merged MPI for all s.

$$C_p^{\prime(s)} = \frac{\sum_{j=p\min(p')}^{p\max(p')} a^{(s)}(j)C_j^{(s)}}{\sum_{j=p\min(p')}^{p\max(p')} a^{(s)}(j)}$$

$$A_p^{\prime(s)} = \frac{\sum_{j=p\min(p')}^{p\max(p')} a^{(s)}(j)A_j^{(s)}}{\sum_{j=p\min(p')}^{p\max(p')} a^{(s)}(j)}$$

$$d_p' = \frac{\sum_{j=p\min(p')}^{p\max(p')} a^{(s)}(j)d_j}{\sum_{j=p\min(p')}^{p\max(p')} a^{(s)}(j)}$$

End

2.1.6 Full Multi-Camera Layer Merging Processing Pipeline

Figure 7:
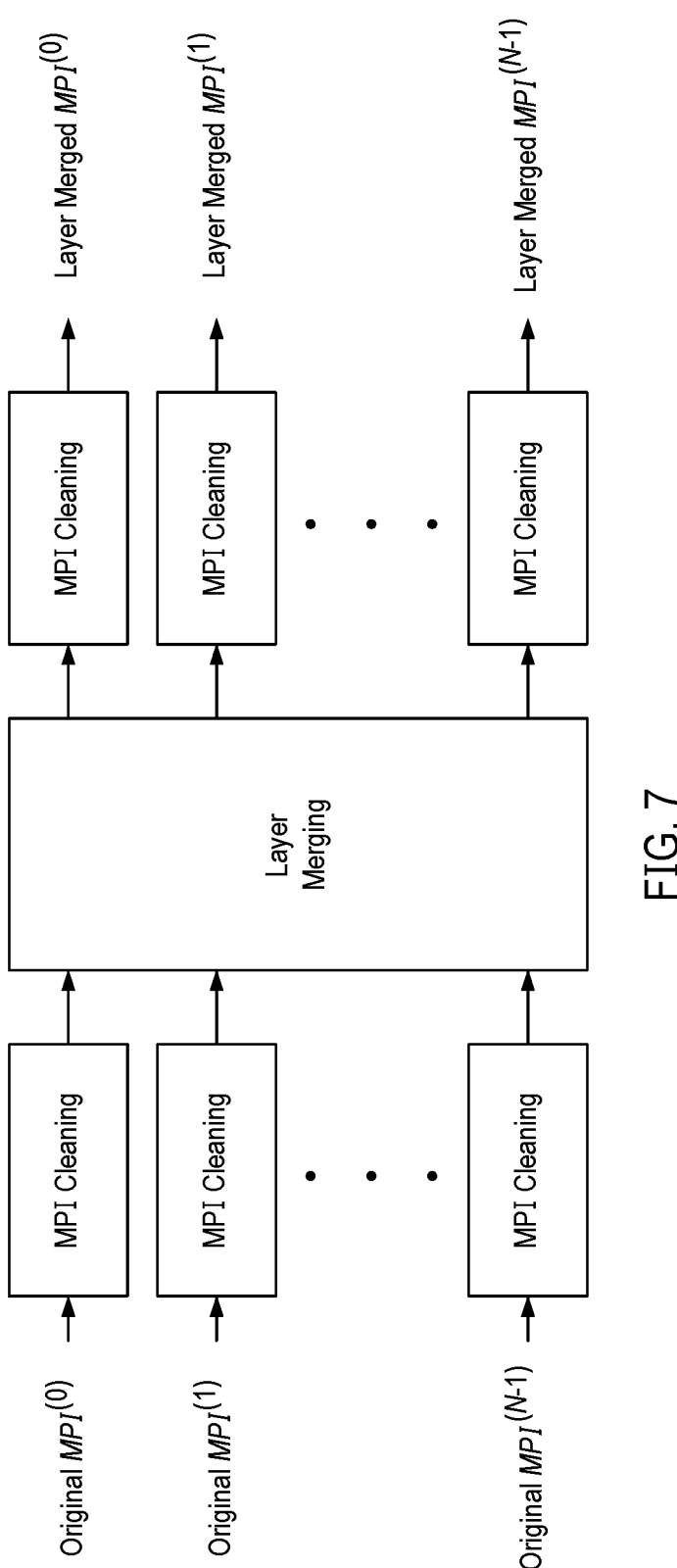
FIG. 7 is a flowchart illustrating a full layer merging processing pipeline a multi-camera scenario.

Like the single camera scenario, the direct application of layer merging without any pre- or post-processing will cause significant artifacts to appear in the rendered multi-plane images in the multi-camera scenario. Thus, we apply a similar processing pipeline in the multi-camera scenario in which we clean the multi-plane images before and after layer merging. FIG. 7 is a block diagram that illustrates this process.

4. Multi-Plane Image Multi-Camera Post Warp Cleaning

Figure 8:
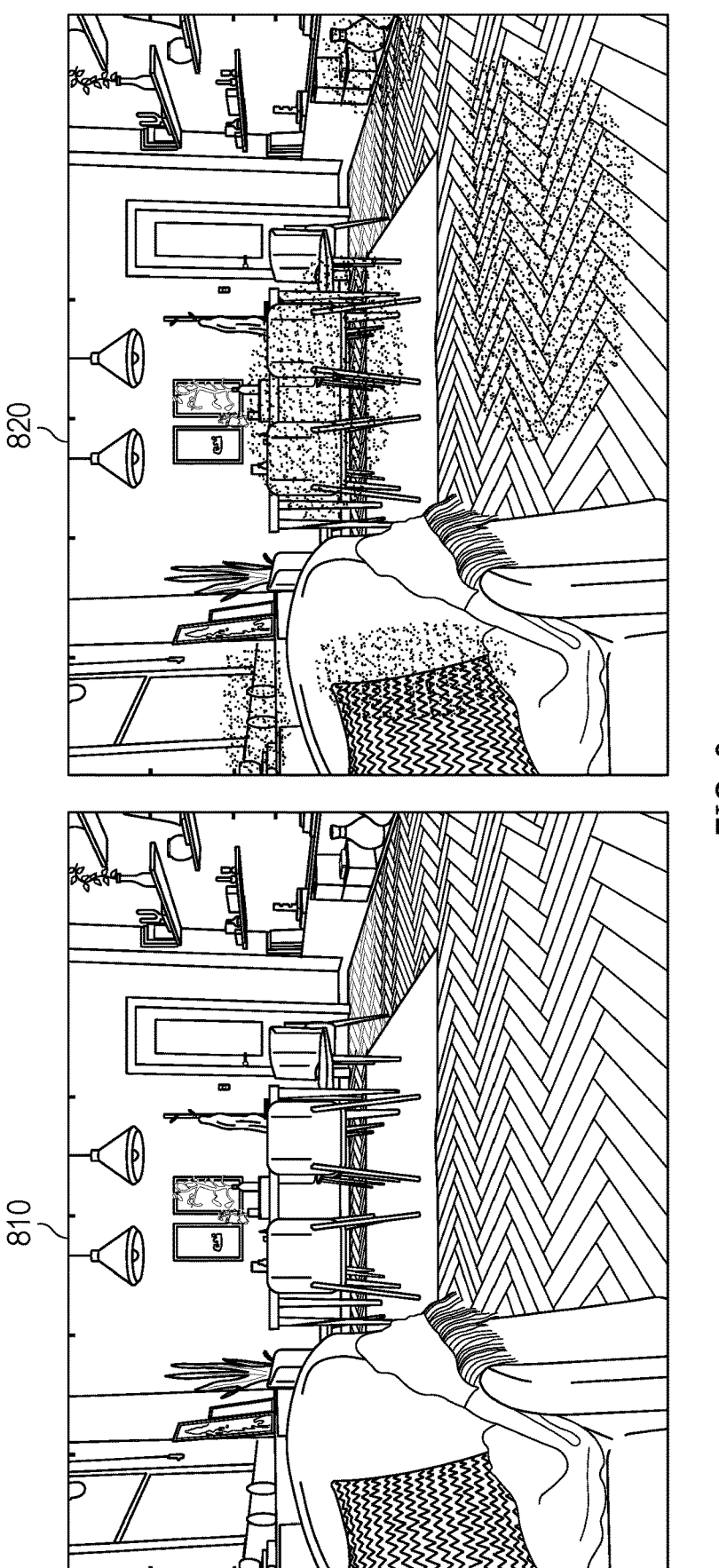
FIG. 8 includes a (i) reference image of a scene captured from a reference position and a (ii) synthesized image of the scene, captured from an adjacent position and warped to the reference position.

In this section, the multi-camera post warp clean problem is formulated as a regression problem, and a solution to the problem is provided. The motivation for this problem comes from the fact that the MPI generation source may be flawed. This causes inconsistencies in the generated MPI data, including inaccuracies in the warping function. When a novel view is synthesized from multiple different cameras using equation (20), the resulting inaccuracies deteriorate the quality of the final rendered image. An example of this is shown FIG. 8, in which a synthesized novel-view image 820, captured from a second position and warped to a reference position, looks blurry compared to a reference image 810 captured from the reference position adjacent to the second position.

The MPI generation source provides a grid of MPI cameras that can be used to generate novel views. If we warp the MPI information at a particular camera location to one of its neighboring cameras in the grid, we observe similar artifacts to those seen at other novel view locations. Luckily, each neighbor in the grid contains a reference image. Thus, by warping the MPI at the current camera location to a neighboring camera location, we can calculate the error between the synthesized image and reference image. Our problem formulation proposes to propagate back this error information to the original camera location so that the MPI information at this location can be corrected. By correcting for the warping issues at multiple local novel view positions, the model will likely mitigate the warping error at other neighboring novel view positions.

3.1 Problem Formulation

Let t be a novel view position that contains a reference image, R(t). Suppose that we synthesize an image, Ĭ(t), at location t using the MPI information from neighboring cameras of the MPI grid using equation (20). Let $T_t$ be the set of all neighboring cameras of location t. Then, the error between the reference image and synthesized image is given by:

$$E = R^{(t)}(x, y) - \breve{I}^{(t)}(x, y) \tag{28}$$

$$= \sum_{t \in T_t} B^{(s \to t)}(x, y)\left(R^{(t)}(x, y) - I^{(s \to t)}(x, y)\right)$$

-continued $$= \sum_{t \in T_t} B^{(s \to t)}(x, y) \left( R^{(t)}(x, y) - \sum_{p=0}^{D-1} W_p^{(s \to t)}(x, y) C_p^{(s \to t)}(x, y) \right)$$

$$= \sum_{t \in T_t} B^{(s \to t)}(x, y) \sum_{p=0}^{D-1} W_p^{(s \to t)}(x, y) \left( R_p^{(t)}(x, y) - C_p^{(s \to t)}(x, y) \right)$$

$$= \sum_{t \in T_t} \sum_{p=0}^{D-1} B^{(s \to t)}(x, y) W_p^{(s \to t)}(x, y) \left( R_p^{(t)}(x, y) - C_p^{(s \to t)}(x, y) \right)$$

where the second expression holds since $\Sigma_{t \in T_t} B^{(s \to t)}(x, y) = 1$ at every pixel location and $$R_p^{(t)}(x, y) = R^{(t)}(x, y) / W_p^{(s \to t)}(x, y).$$

Observe that each term of the double summation in this equation represents the error contributed by each layer of an individual neighboring camera's MPI to the overall deviation at the novel view for a pixel, (x, y). This observation motivates two perspectives of seeing the problem:

1. Perspective 1: Our goal is to minimize the square of the error received at a novel view location from its neighbors for all novel views containing a reference image.
2. Perspective 2: Our goal is to minimize the square of the error contributed by each camera to each of the neighboring novel views that contains a reference image.

Both views aim to solve the same problem, but we focus on the formulation of perspective 2.

Let $$\left\{ R_p^{(t \to s)} \right\}$$

represent the warping of $$\left\{ R_p^{(t)} \right\}$$

from position to position s and let $$R^{(t \to s)} = \Sigma_{p=0}^{D-1} W_p^{(s)} R_p^{(t \to s)}.$$

Then the following equation represents the error contributed by camera s to camera t:

$$B^{(t \to s)}(x, y) \left( R^{(t \to s)}(x, y) - I^{(s)}(x, y) \right). \tag{29}$$

Let $T_s$ be the set of all neighboring cameras of camera s. Then the total error contributed by camera s to all its neighbors can be obtained by summing over t:

$$\sum_{t \in T_s} B^{(t \to s)}(x, y) \left( R^{(t \to s)}(x, y) - I^{(s)}(x, y) \right). \tag{30}$$

Let N represent the total number of cameras in the grid produced by the MPI generation source. Then total error contributed by all cameras in the grid to all their neighbors can be obtained by summing the previous equation over s:

$$\sum_{s=0}^{N-1} \sum_{t \in T_s} B^{(t \to s)}(x, y) \left( R^{(t \to s)}(x, y) - I^{(s)}(x, y) \right). \tag{31}$$

Observe that $R^{(t \to s)}$ and $I^{(s)}$ are rendered forms. We can decompose equation (31) into the sum of the product of the texture and weighting factors at each depth location:

$$\sum_{s=0}^{N-1} \sum_{t \in T_s} B^{(t \to s)}(x, y) \left( \sum_{p=0}^{D-1} W_p^{(s)}(x, y) R_p^{(t \to s)}(x, y) - \sum_{p=0}^{D-1} W_p^{(s)}(x, y) C_p^{(s)}(x, y) \right) \tag{32}$$

We can combine the summations over p to obtain:

$$\sum_{s=0}^{N-1} \sum_{t \in T_s} \sum_{p=0}^{D-1} B^{(t \to s)}(x, y) W_p^{(s)}(x, y) \left( R_p^{(t \to s)}(x, y) - C_p^{(s)}(x, y) \right). \tag{33}$$

This provides us with a useful form for formulating a linear regression problem in the next section. The aim is to devise a solution that brings this equation close to zero.

3.1 Problem Solution via Optimization

Our solution assumes that we are only allowed to linearly modify the texture channels of any camera's MPI to improve the quality of synthesized novel views (though this assumption may be generalized to non-linear forms of regression). Thus by letting $$\beta_p^{(s)}$$

represent the coefficients used to modify the texture information of $p^{th}$ depth of camera s at pixel (x,y), we aim to solve the following minimization problem:

$$\min_{\{\beta_p^{(s)}\}} \left( \sum_{s=0}^{N-1} \sum_{t \in T_s} \sum_{p=0}^{D-1} B^{(t \to s)}(x, y) W_p^{(s)}(x, y) \left( R_p^{(t \to s)}(x, y) - \beta_p^{(s)} C_p^{(s)}(x, y) \right) \right)^2 \tag{34}$$

Note that we can restructure the terms inside the square of this minimization problem as follows:

$$\sum_{s=0}^{N-1} \sum_{t \in T_s} \sum_{p=0}^{D-1} B^{(t \to s)}(x, y) W_p^{(s)}(x, y) \left( R_p^{(t \to s)}(x, y) - \beta_p^{(s)} C_p^{(s)}(x, y) \right) = \tag{35}$$

$$\sum_{s=0}^{N-1} \sum_{p=0}^{D-1} \sum_{t \in T_s} B^{(t \to s)}(x, y) W_p^{(s)}(x, y) \left( R_p^{(t \to s)}(x, y) - \beta_p^{(s)} C_p^{(s)}(x, y) \right) =$$

$$\sum_{s=0}^{N-1} \sum_{p=0}^{D-1} \sum_{t \in T_s} B^{(t \to s)}(x, y) W_p^{(s)}(x, y) \left( R_p^{(t \to s)}(x, y) - \right.$$

-continued
$$\beta_p^{(s)} B^{(t \to s)}(x, y) W_p^{(s)}(x, y) C_p^{(s)}(x, y)) =$$

$$\sum_{s=0}^{N-1} \sum_{p=0}^{D-1} \left[ \underbrace{\left\{ \sum_{t \in T_s} B^{(t \to s)}(x, y) W_p^{(s)}(x, y) \left( R_p^{(t \to s)}(x, y) \right) \right\}}_{F_p^{(s)}} - \right.$$

$$\beta_p^{(s)} \underbrace{\left\{ \sum_{t \in T_s} B^{(t \to s)}(x, y) W_p^{(s)}(x, y) \left( R_p^{(t \to s)}(x, y) \right) \right\}}_{G_p^{(s)}} =$$

$$\sum_{s=0}^{N-1} \sum_{p=0}^{D-1} \left[ F_p^{(s)}(x, y) - \beta_p^{(s)} G_p^{(s)}(x, y) \right] =$$

$$\underline{1}_N^T F \underline{1}_D - \underline{1}_N^T (G \odot \beta) \underline{1}_D = \underline{1}_N^T (F - G \odot \beta) \underline{1}_D.$$

In the final two expressions of equation (35), (represents the Hadamard product, and $1_N$ and $1_D$ are vectors of length N and D containing entries of ones. F, G, and $\beta$ are matrices in which.

$$F(s, p) = F_p^{(s)}(x, y), \; G(s, p) = G_p^{(s)}(x, y), \; \text{and} \; \beta(s, p) = \beta_p^{(s)}.$$

Each matrices F, G, and $\beta$ has dimensions N×D, where N is the number of cameras and D is the number of depth planes. This allows us to convert the previous optimization problem into a simple element-wise least squares problem given by:

$$\min_\beta \frac{1}{2} \|F - G \odot \beta\|^2. \tag{36}$$

This solution is a per-pixel solution meaning that the matrix $\beta \in \mathbb{R}^{N \times D}$ will be used to update a given pixel location (x, y) across all N cameras and D depths. Specifically, $\beta$ is applied through pointwise multiplication to the depths of every camera at a fixed pixel location (x, y). Hence, matrix B must be solved for every pixel location of the image. Note that we apply $\beta$ to each texture color channel uniformly, meaning that, in embodiments, we only solve for one $\beta$ to update all three texture color channels. The solution to the problem can be found by taking the gradient of the expression in the minimization problem, setting it to 0, and solving for the optimal coefficients:

$$G \odot (F - G \odot \beta) = 0 \tag{37}$$

$$G \odot F = G \odot G \odot \beta$$

$$\beta = F \oslash G,$$

where $\oslash$ represents the Hadamard division operator.

Function: $\left\{ \left\{ C_p^{(s)} \right\} \text{ for } p = 0, \ldots, D-1 \right\}_{s=0}^{N-1} =$ N_camera_post_warp_clean$\left( \left\{ \left\{ C_p^{(s)} \right\}, \left\{ A_p^{(s)} \right\}, \{d_p\} \text{ for } p = 0, \ldots, D-1 \right\}_{s=0}^{N-1} \right)$ Input: $\left\{ \left\{ C_p^{(s)} \right\}, \left\{ A_p^{(s)} \right\}, \{d_p\} \text{ for } p = 0, \ldots, D-1 \right\}_{s=0}^{N-1}$ alpha, texture, and depth for all N cameras.

Output: Updated texture for every camera $\left\{ \left\{ C_p^{(s)} \right\} \text{ for } p = 0, \ldots, D-1 \right\}_{s=0}^{N-1}$ step-1a: (1a) For each camera location, s, of the MPI dataset, calculate $R_p^{(t)}(x, y) =$ $R^{(t)}(x, y)/W_p^{(s \to t)}(x, y)$, for each of its neighboring cameras, $t \in T_s$.

step-1b: Then warp $\left\{ R_p^{(t)} \right\}$ from position t to position s to obtain $\left\{ R_p^{(t \to s)} \right\}$, e.g., by using equation (1).

step-2: Calculate the contribution $B^{(t \to s)}$ of camera s to each of its neighbors, $t \in T_s$. Now we have all the following information: $C_p^{(s)}$, $W_p^{(s)}$, $B^{(t \to s)}$, and $R_p^{(t \to s)}$ that we need for the remaining calculations.

step-3: For each pixel location (x, y), calculate F and G and use them to calculate $\beta = F \oslash G$.

step-4: For each pixel location (x, y) update the texture information of every layer, $p = 0, \ldots, D-1$, for each camera location, $s = 0, \ldots N-1$, through multiplying by the values in $\beta \in \mathbb{R}^{N \times E}$. Specifically, the rows of $\beta$ correspond with camera location and the columns of $\beta$ correspond with depth information. So, we update the same (x, y) location for all depths in every camera's texture at the same time.

Figure 9:
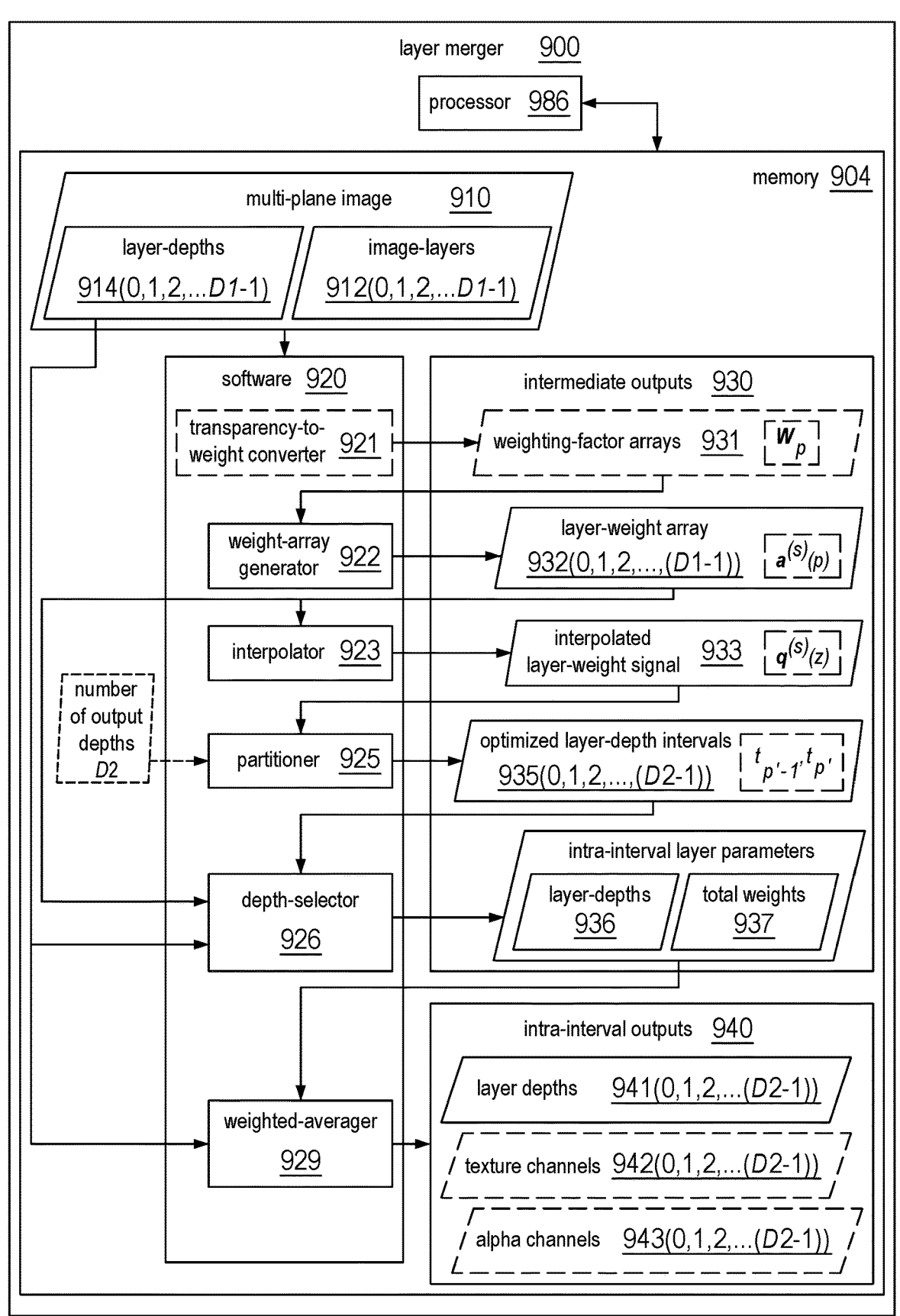
FIG. 9 is a schematic of a layer merger for a single camera, in an embodiment.

FIG. 9 is a schematic of an image-layer merger 900, which executes the function single_camera_interpolation introduced in the description of method 400. Image-layer merger 900 includes a processor 986 and a memory 904. Memory 904 stores a multiplane image 910, software 920, intermediate outputs 930, and intra-interval outputs 940.

Memory 904 may include one or more types of data storage. Memory 904 may be transitory and/or non-transitory and may include one or both of volatile memory (e.g., SRAM, DRAM, computational RAM, other volatile memory, or any combination thereof) and non-volatile memory (e.g., FLASH, ROM, magnetic media, optical media, other nonvolatile memory, or any combination thereof). Part or all of memory 904 may be integrated into processor 986.

Multi-plane image 910 includes D1 image layers 912(0, 1, 2 . . . , (D1-1)) each located at a respective one of D1 layer-depths 914(0, 1, 2, . . . , (D1-1)), where D1 is a positive integer greater than one. D1 is an example of D in function alpha_to_weight and subsequent functions. Multi-plane image 910 is an example of multi-plane image 100, FIG. 1. Memory 904 stores non-transitory computer-readable instructions as software 920. When executed by processor 986, software 920 causes processor 986 to implement the functionality of image-layer merger 900 as described herein. Software 920 may be firmware, or include firmware.

Software 920 includes a transparency-to-weight converter 921, a weight-array generator 922, an interpolator 923, a partitioner 925, a depth-selector 926, and a weighted-averager 929. Intermediate outputs 930 include weighting factor arrays 931, layer-weight array 932, an interpolated layer-weight signal 933, optimized layer-depth intervals 935, intra-interval layer-depths 936, and intra-interval layer weights 937. Layer-weight array 932 includes D1 elements.

Intra-interval outputs 940 include intra-interval layer depths 941 (0, 1, 2, . . . (D2-1)), and may also include at least one of intra-interval texture channels 942(0, 1, 2, . . . (D2-1)), and intra-interval alpha channels 943(0, 1, 2, . . . (D2-1)). D2 denotes a number of output depths, is a positive integer that is less than D1, and may be stored in memory 904. D2 is an example of D' in function single_camera_naive and subsequent functions.

Examples of weighting factor array 931, layer-weight array 932, interpolated layer-weight signal 933 are: $W_p(x, y)$ of the function alpha_to_weight, layer weight $a^{(s)}(p)$ of equation (11), and $q^{(s)}(z)$ of equation (12), respectively. Partition intervals $[t_{p'-1}, t_{p'})$ are an examples of optimized layer-depth intervals 935, where p'=1, . . . , (D'-1), as in the function constrained_Lloyd_Max.

An example of the intra-interval layer-depths 936 is discussed before equations (19). Layer depths 936 are, for example, depths dj for values of index j between $j = p_{min}(p')$ and $j = p_{max}(p')$. For a given optimized layer-depth interval 935, the intra-interval layer-depths 936 are layer depths 914 that are within the optimized layer-depth interval 935. Similarly, intra-interval layer weights 937 are values of layer-weight array 932 that correspond to one of the intra-interval layer-depths 936.

The expressions of equations (19a), (19b), and (19c) are examples of intra-interval layer depths 941, intra-interval texture channels 942, intra-interval alpha channels 943, respectively.

FIG. 10 is a flowchart illustrating a method 1000 for merging layers of a multi-plane image (MPI). Method 1000 may be implemented within one or more aspects of image-layer merger 900. In embodiments, method 1000 is implemented by processor 986 executing computer-readable instructions of software 920. Method 1000 includes steps 1010, 1020, 1030, 1040, 1050, and 1060. Method 1000 may also include step 1010. In embodiments, at least one of (a) steps 1010, 1020, and 1030 correspond, respectively, to steps 1-3 of the function single_camera_interpolation: (b) steps 1040 and 1050 correspond to step-4 of the function single_camera_interpolation, and (c) step 1060 corresponds to step-5 of the function single_camera_interpolation.

Step 1020 includes determining a layer-weight array by, for each image-layer of D1 image-layers of the MPI each located at a respective one of D1 layer-depths, determining a respective one of D1 total weights as an element-wise sum of a weighting-factor array of the image-layer. In an example of step 1020, weight-array generator 922 determines layer-weight array 932.

When method 1000 includes step 1010, step 1010 precedes step 1020. Step 1010 includes, for each image-layer of the D1 image-layers, determining the weighting-factor array of the image layer from (i) an alpha channel of the image-layer, and (ii) alpha channels of image-layers, of the D1 image-layers, having a layer-depth smaller than a layer-depth of the layer. In an example of step 1010, weight converter 921 executes equation (7) to determine weighting factor arrays 931.

Step 1010 may include a step 1012, in which includes determining, for each pixel coordinate of the layer, a respective pixel-wise weighting factor from (i) the value of the alpha channel at the pixel coordinate, and (ii) values of the alpha channels at the pixel coordinate. In an example of step 1012, weight converter 921 determines, for each pixel coordinate (x, y), a respective pixel-wise weighting factor $W_p(x, y)$ according to the function alpha_to_weight described in section 1.2.2.

Step 1030 includes interpolating the layer-weight array to yield an interpolated layer-weight signal. The interpolation may be a linear interpolation. In an example of step 1030, interpolator 923 interpolates layer-weight array 932 to yield interpolated layer-weight signal 933.

Step 1040 includes partitioning the interpolated layer-weight signal into D2 segments to yield D2 optimized layer-depth intervals. D2 is less than D1. In an example of step 1040, partitioner 925 partitions interpolated layer-weight signal 933 into D2 segments to yield optimized layer-depth intervals 935(0, 1, 2, . . . , (D2-1)). Step 1040 may include minimizing an objective function, such as J of equation (13), that includes an increasing function of the interpolated layer-weight signal. This function may be at least one of monotonically non-decreasing and monotonically increasing (a.k.a, strictly increasing).

Step 1040 may include at least one of steps 1041-1044. In embodiments, steps 1041-1044 correspond, respectively, to steps 1-4 of the function constrained_Lloyd_Max described in section 2.1.2. Partitioner 925 may execute each of steps 1041-1044.

Steps 1042-1044 apply when each pair of adjacent layer-depths of the D1 layer-depths are separated by a same initial distance. This same initial distance may result from step 1041, which includes initializing D2 layer-depth intervals such that each of the D2 layer-depth intervals has an equal length.

Step 1042 includes determining D2 weighted depths by, for each of D2 layer-depth intervals each having a respective one of a plurality of lower-boundaries, determining a respective one of D2 weighted depths as an average of layer-depth values within the layer-depth interval weighted by values of the interpolated layer-weight signal within the layer-depth interval. In step-2 of constrained_Lloyd_Max, each value of $r_p$, is a respective weighted depth.

Step 1043 includes updating the D2 layer-depth intervals by, for each layer-depth interval of the D2 layer-depth intervals for which the initial distance is less than a difference between (i) an average R of the layer-depth interval's associated weighted depth and the subsequent weighted depth and (ii) the lower-boundary of the layer-depth interval, changing the value of the lower boundary to equal the average R.

Step 1044 includes obtaining the D2 optimized layer-depth intervals by iterating said steps of determining D2 weighted depths and updating the D2 layer-depth intervals until the plurality of lower-boundaries converge to within a predetermined tolerance.

Step 1050 includes determining, for each of the D2 optimized layer-depth intervals. (i) a number of intra-interval layer-depths, of the D1 layer-depths, located within the optimized layer-depth interval; and (ii) a number of intra-interval layer weights, of the D1 total weights, each associated with a respective one of the number of intra-interval layer-depths. In an example of step 1050, depth-selector 926 determines, for each optimized layer-depth interval 935. (i) intra-interval layer-depths 936, of layer-depths 914, located within the layer-depth interval 935; and (ii) intra-interval layer weights 937, of layer-weight array 932, each associated with a respective intra-interval layer-depth 936.

Step 1060 includes step 1061, and may also include at least one of steps 1062 and 1063. Step 1061 includes determining, for each of the D2 optimized layer-depth intervals, a respective output layer-depth as an average of the number of intra-interval layer-depths weighted by a respective one of the number of intra-interval layer weights. In an example of step 1061, weighted-averager 929 determines, for each optimized layer-depth interval 935($p'$), a respective intra-interval layer depth 941($p'$) from layer depths 936 and total weights 937. In steps 1061-1-63, $p'$ ranges from zero to (D2-1).

Step 1060 may include steps 1062 and 1063 when each of the number of intra-interval layer-depths being a layer-depth of a respective one of a number of intra-interval image layers, of the D1 image layers. Each intra-interval image layer has a respective one of a number of intra-interval texture channels and a respective one of a number of intra-interval alpha channels.

Step 1062 includes determining, for each of the D2 optimized layer-depth intervals, a respective texture channel as an average of the number of intra-interval texture channels weighted by a respective one of the number of intra-interval layer weights. An example of the texture channel is $$C_{p'}^{\prime(s)}$$

of equation (19a), mi an example of step 1062, weighted-averager 929 determines, for each optimized layer-depth interval 935($p'$), a respective texture channel 942($p'$) from layer depths 936, total weights 937, and texture data of multiplane image 910 that corresponds to layer-depths 936. In embodiments, this texture data is $$C_j^{(s)}$$

for values of j between $p_{min}(p)$ and $p_{max}(p')$, as in equation (19b).

Step 1063 includes determining, for each of the D2 optimized layer-depth intervals, a respective alpha channel as an average of the number of intra-interval alpha-channels weighted by a respective one of the number of intra-interval layer weights. An example of the alpha channel is $$A_{p'}^{\prime(s)}$$

of equation (19b). In an example of step 1063, weighted-averager 929 determines, for each optimized layer-depth interval 935($p'$), a respective alpha channel 943($p'$) from layer depths 936, total weights 937, and alpha channels of multiplane image 910 that corresponds to layer-depths 936. In embodiments, each alpha channel is a respective $$A_j^{(s)}$$

for values of j between $p_{min}(p)$ and $p_{max}(p')$, as in equation (19c).

Figure 11:
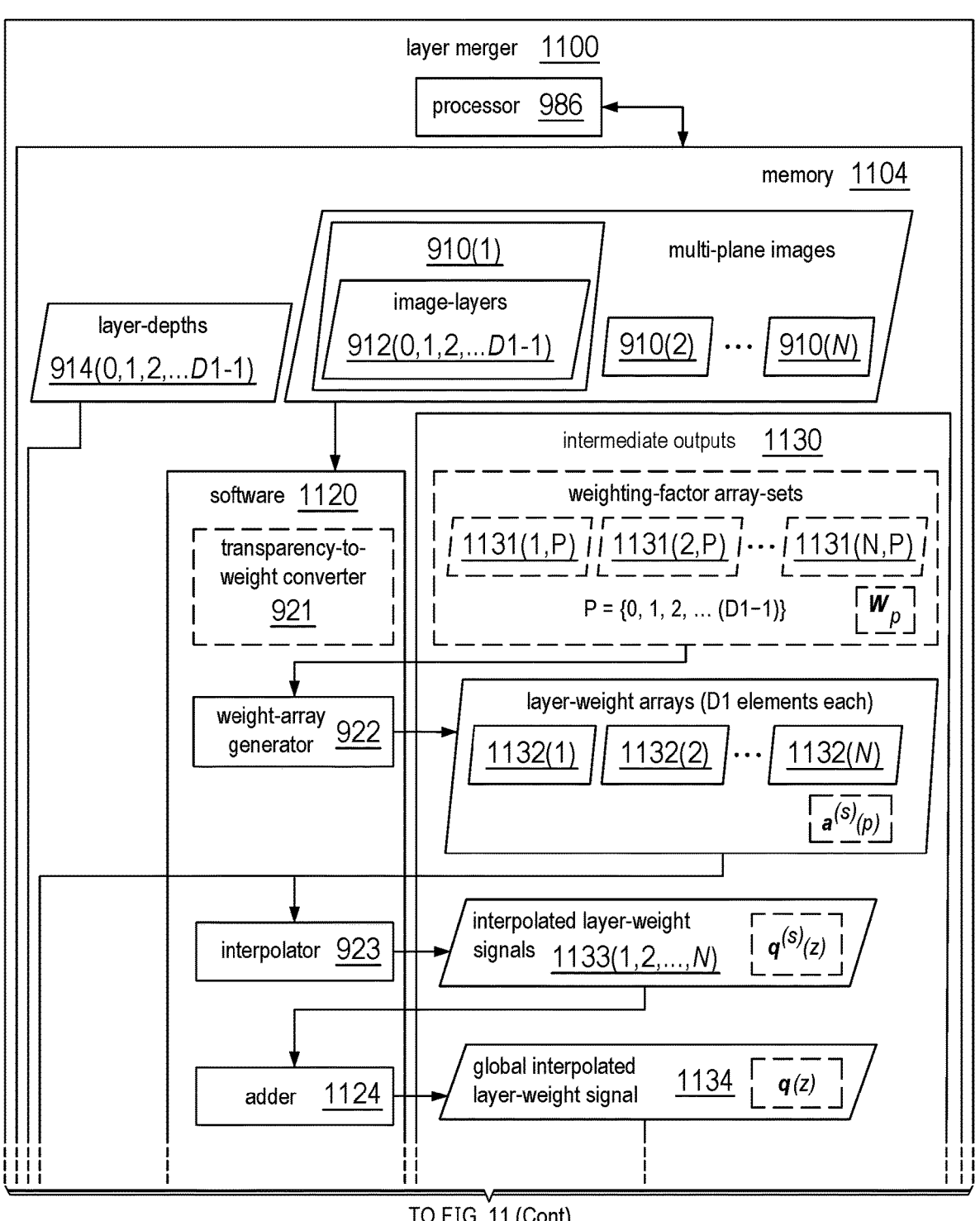
FIG. 11 is a schematic of a layer merger for multiple cameras, in an embodiment.
Figure 11:
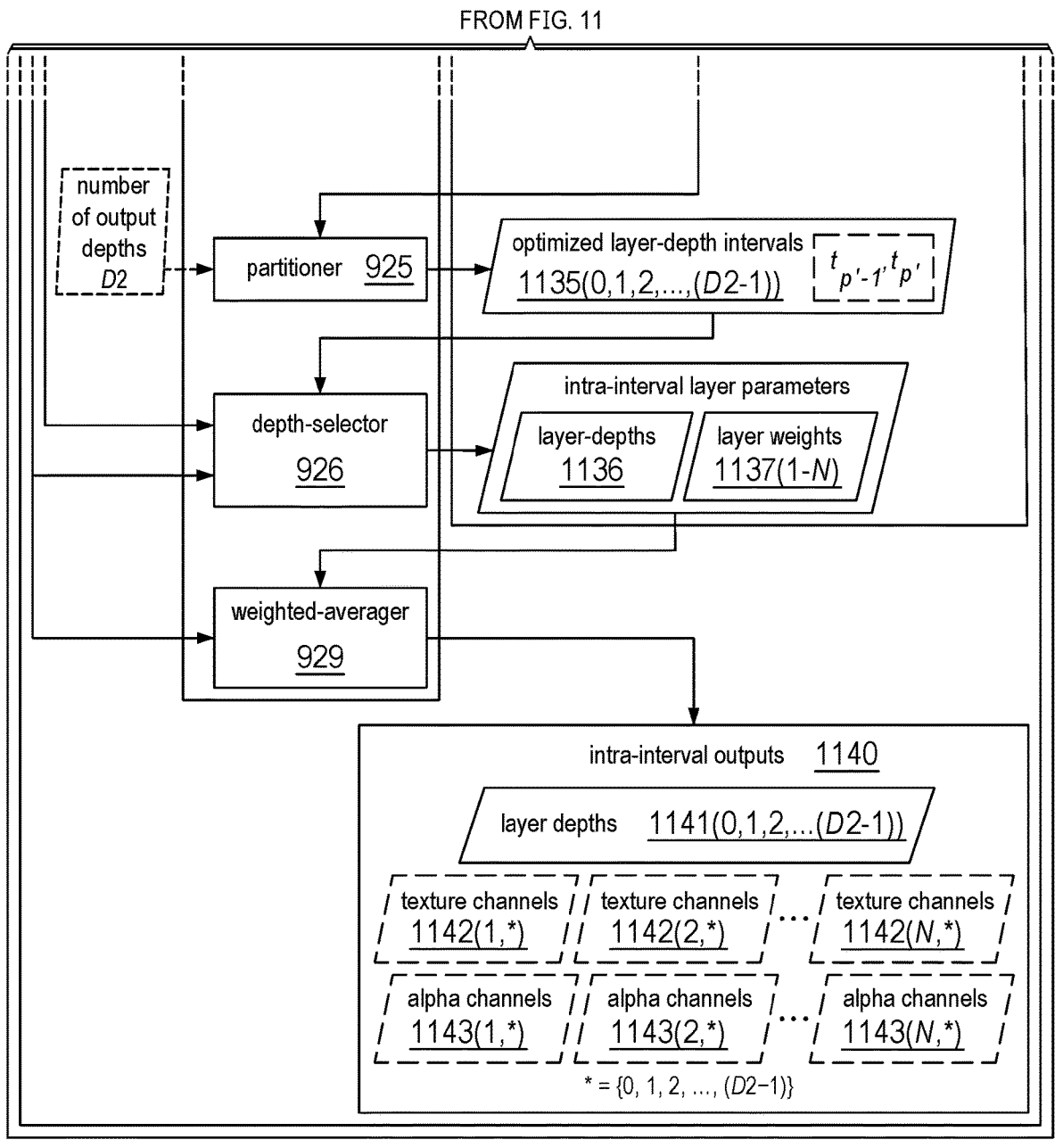

FIG. 11 is a schematic of an image-layer merger 1100, which executes the function multi_camera_interpolation described in section 2.1.5. Image-layer merger 1100 is an example of image-layer merger 900, FIG. 9, and includes a memory 1104 and software 1120, which are respective examples of memory 904 and software 920. Image-layer merger 1100 determines output layer depths based on multiple multi-plane images, rather than just multi-plane image.

Accordingly, memory 904 of image-layer merger 1100 stores a number N multi-plane images 910 (1, 2 . . . , N), and software 1120 includes an adder 1124. Weight converter 921 generates N weighting-factor array-sets 1131, each of which includes D1 weighting factor arrays 931—one array for each layer of an MPI 910. Each weighting factor array is an example of weighting factor array 931. From each weighting-factor array-set 1131($n$), weight-array generator 922 generates a respective set of layer-weight array 1132($n$), where n is a positive integer less than or equal to N. Each layer-weight array 1132 is an example of layer-weight array 932.

Interpolator 923 generates a respective one of N interpolated layer-weight signals 1133 from each of the N layer-weight arrays 1132. Each signal 1133($n$) is an example of signal 933 corresponding to multi-plane image 910($n$). Adder 1124 sums signals 1133 to yield a global interpolated layer-weight signal 1134, which is input to partitioner 925.

Image-layer merger 1100 includes intermediate outputs 1130, which is an example of intermediate outputs 930 that includes layer-weight array 932, global interpolated layer-weight signal 1134, and may include weighting factor arrays 931. Intermediate outputs 1130 also optimized layer-depth intervals 1135, intra-interval layer-depths 1136, and intra-interval layer weights 1137 (1-N), which are respective examples of layer-depth interval 935, intra-interval layer-depths 936, and intra-interval layer weights 937. Memory 1104 also stores intra-interval outputs 1140, which include (D2×N) intra-interval texture channels 1141, (D2×N) intra-interval alpha channels 1142, and D2 intra-interval depths 1143, which are examples of texture channels 942, alpha channels 943, and depths 941, respectively.

Figure 12:
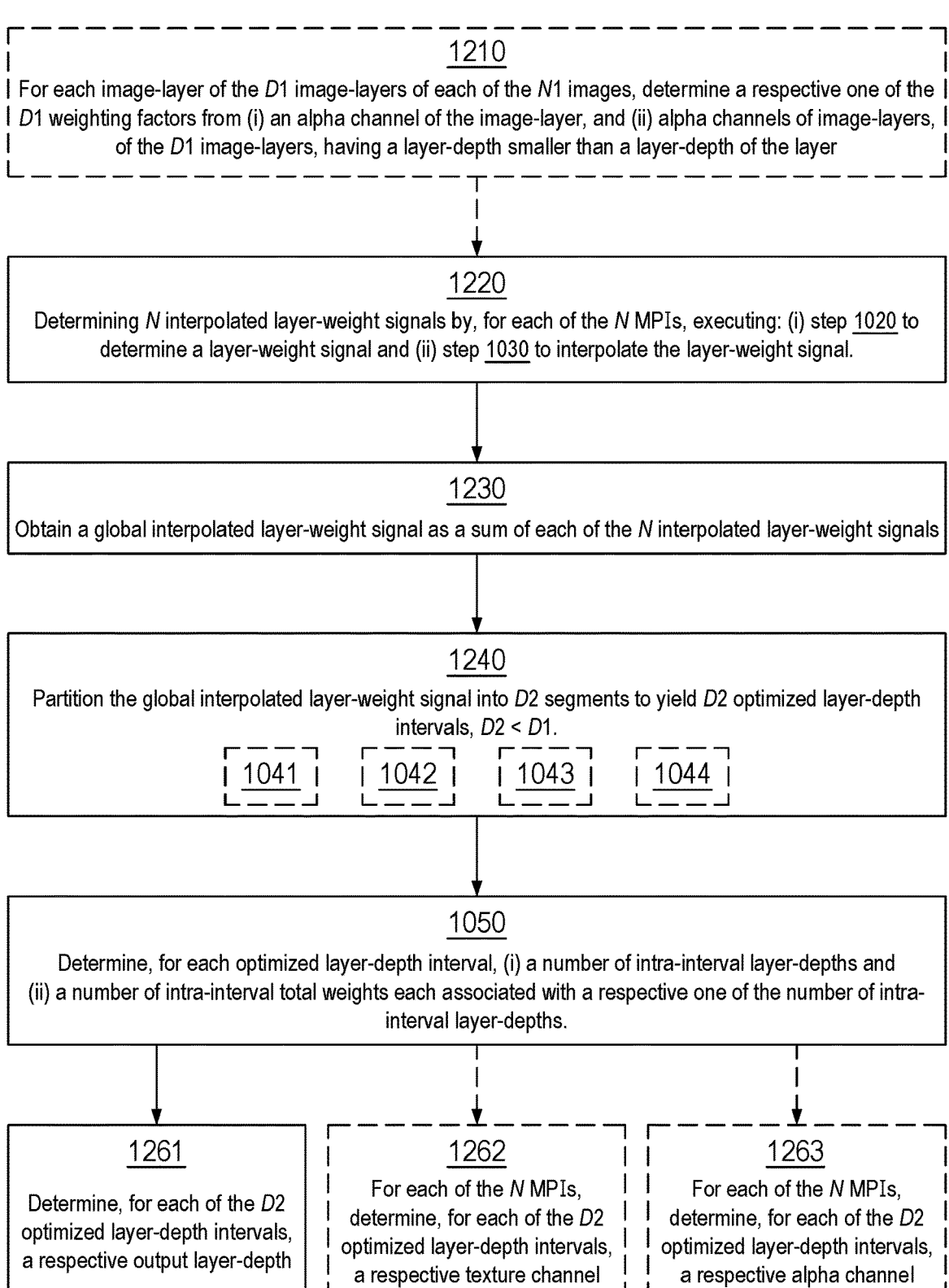
FIG. 12 is a flowchart illustrating a multiple-camera MPI layer-merging method, which may be implemented by the layer merger of FIG. 11, in an embodiment.

FIG. 12 is a flowchart illustrating a method 1200 for merging layers of multiple multi-plane images (MPIs), e.g., N MPIs from N different camera poses of a scene. Method 1200 may be implemented within one or more aspects of image-layer merger 1100. In embodiments, method 1200 is implemented by processor 986 executing computer-readable instructions of software 1120. At least one step of method 1200 corresponds to a step of the function multi_camera_interpolation introduced after equation (28).

Method 1200 includes steps 1220, 1230, 1240, 1050, and 1261. Method 1200 may also include at least one of steps 1210, 1262, and 1263. Step 1050 was introduced in the description of method 1000 Step 1261-1263 are respective examples of steps 1061-1063.

Step 1210 is an example of step 1010, and includes, for each image-layer of the D1 image-layers of each of the N reference images, determining a respective one of the D1 weighting factors from (i) an alpha channel of the image-layer, and (ii) alpha channels of image-layers, of the D1 image-layers, having a layer-depth smaller than a layer-depth of the layer. In an example of step 1210, weight converter 921 executes equation (7) to determine N weighting-factor array-sets 1131.

Step 1220 includes determining N interpolated layer-weight signals by, for each of the N MPIs, executing: (i) step 1020 of method 1000 to determine a layer-weight array and (ii) step 1030 of method 1000 to linearly interpolate the layer-weight array. In an example of step 1220, weight-array generator 922 generates a respective one of layer-weight arrays 1132 (1-N) from each weighting-factor array-set 1131, and interpolator 923 interpolates each of the N layer-weight arrays 1132 to yield a respective interpolated layer-weight signal 1133.

Step 1220 may also include executing step 1010 of method 1000 for each of the N MPIs. In such embodiments, transparency-to-weight converter 921 generates weighting-factor array-sets 1131 (1-N).

Step 1230 includes obtaining a global interpolated layer-weight signal as a sum of each of the N interpolated layer-weight signals. In an example of step 1230, adder 1124 executes step-4 of the function multi_camera_interpolation to generate global interpolated layer-weight signal 1134 from interpolated layer-weight signals 1133.

Step 1240 includes partitioning the global interpolated layer-weight signal into D2 segments to yield D2 globally-optimized layer-depth intervals. D2 is less than D1. Step 1240 is an example of step 1040, and hence may include at least one of steps 1041-1044. In an example of step 1240, partitioner 925 partitions global interpolated layer-weight signal 1134 into D2 segments to yield optimized layer-depth intervals 1135 (0, 1, 2 . . . (D2-1)).

Step 1050 was introduced in the description of method 1000. In an example of step 1050, depth-selector 926 determines, for each optimized layer-depth interval 1135, (i) intra-interval layer-depths 1136, of layer-depths 914, located within the layer-depth interval 1135; and (ii) intra-interval layer weights 1137 (1-N), of layer-weight array 1132, each associated with a respective intra-interval layer-depth 1136. For each value of positive index n≤N, each intra-interval total weight 1137(n) may include more than one of the D1 weights of layer-weight array 1132(n), depending on the number of layer depths 1136 are within each optimized layer-depth interval 1135.

Step 1261 includes determining for each of the D2 globally-optimized layer-depth intervals, a respective output layer-depth as an average of the number of intra-interval layer-depths weighted by a respective one of the number of intra-interval layer weights. In an example of step 1261, weighted-averager 929 determines, for each optimized layer-depth interval 1135(p'), a respective intra-interval layer depth 1136(p'). In steps 1261-1263, index p' ranges from zero to (D2-1).

Step 1262 includes, for each of the N of MPIs, determining a respective texture channel by executing step 1062. In an example of step 1262, weighted-averager 929 determines, for each MPI 910(n), a respective texture channel 1142 (n, {0, 1, 2 . . . (D2-1)}).

Step 1263 includes, for each of the N of MPIs, determining a respective alpha channel by executing step 1063. In an example of step 1263, weighted-averager 929 determines, for each MPI 910(n), a respective alpha channel 1143 (n, {0, 1, 2 . . . (D2-1)}).

Figure 13:
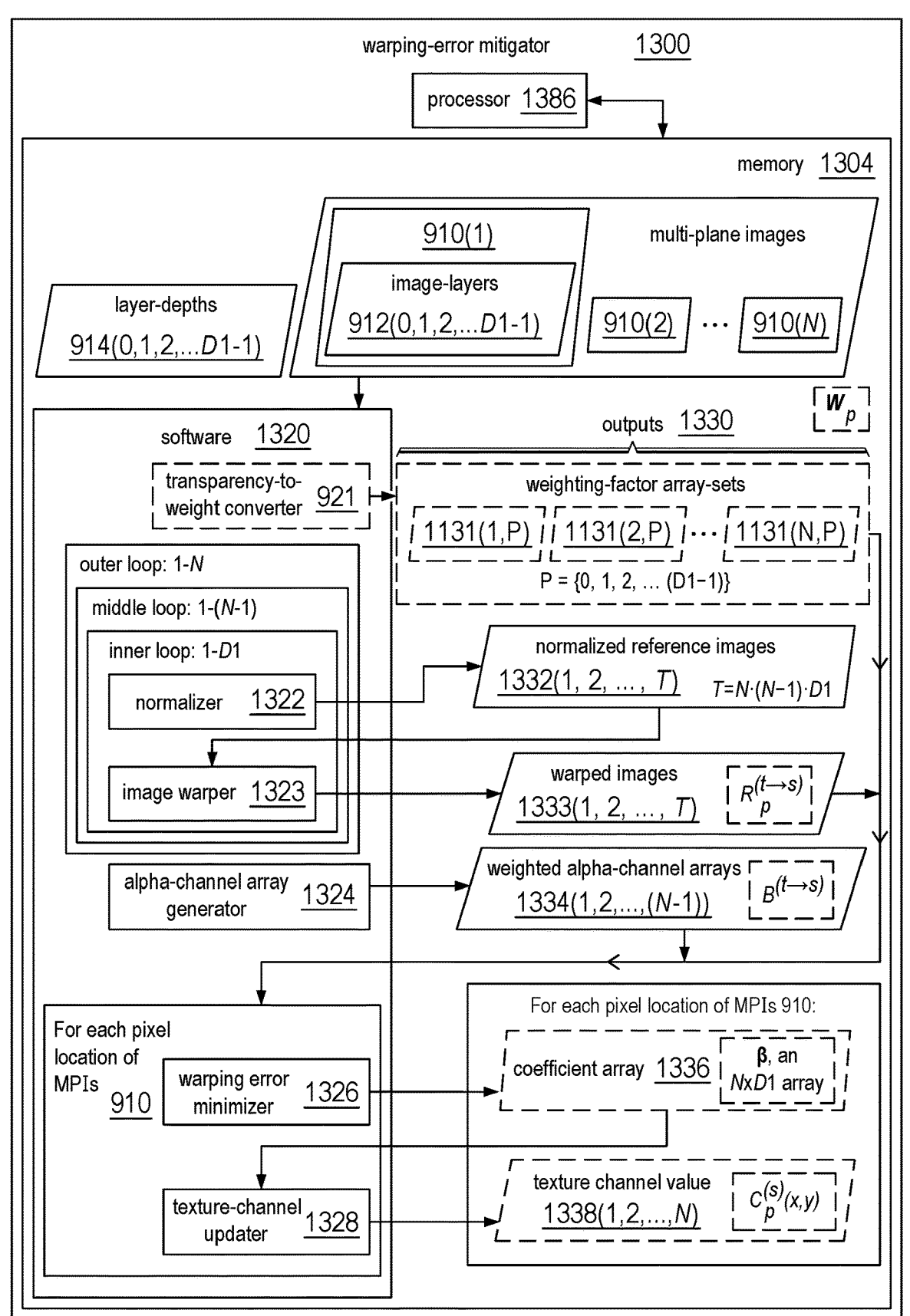
FIG. 13 is a schematic of a warping-error mitigator, in an embodiment.

FIG. 13 is a schematic of a warping-error mitigator 1300, which executes the function N_camera_post_warp_clean introduced after equation (38). Warping-error mitigator 1300 includes a processor 1386 and a memory 1304. Memory 1304 stores N multi-plane images 910, software 1320, and outputs 1330. Memory 1304 may include one or more types of data storage, such as those listed for memory 904. Part or all of memory 1304 may be integrated into processor 1386. Each multi-plane image 910 has D1 image-layers 912.

Software 1320 includes a normalized 1322, an image warper 1323, an alpha-channel array generator 1324, a warping error minimizer 1326, and a texture-channel updater 1328. Outputs 1330 include normalized reference images 1332, warped images 1333, weighted alpha-channel: arrays 1334, coefficient array 1336, and texture channel values 1338, which are generated by normalizer 1322, image warper 1323, alpha-channel array generator 1324, warping error minimizer 1326, and texture-channel updater 1328, respectively.

Software 1320 may also include transparency-to-weight converter 921, introduced as part of image-layer merger 900. As in image-layer-merger 1100, transparency-to-weight converter 921 generates N weighting-factor array-sets 1131.

An example of a normalized reference image 1332 is $$R_p^{(t)},$$

introduced after equation (29) and after step-1 of the function N_camera_post_warp_clean. An example of a warped image 1333 is $$R_p^{(t \to s)},$$

which may be obtained by applying equation (1) to the texture channel and transparency channel of warp reference image $$R_p^{(t)}$$

to warp image $$R_p^{(t)}$$

from position t to position s. Weighted alpha-channel array 1334 includes N arrays. An example of weighted alpha-channel array 1334 is $B^{(t \to s)}$, which is $B^{(s \to t)}$ of equation (24) with camera locations s and t switched.

The size of coefficient array 1336 and texture channel values 1338 may each be N by D1. An example of coefficient array is $\beta$, introduced in equation (36) and described in subsequent equations and the function N_camera_post-_warp_clean. An example texture channel values 1338 is $$C_p^{(s)}(x, y)$$

of equation (33), where coordinate (x, y) is the pixel location. In embodiments, coefficient array 1336 has N rows and D1 columns, such that the element in row j and column k of coefficient array 1336 corresponds to the kth image-layer of the $j^{th}$ reference image, where j and k are positive integers less than or equal to N and D1, respectively.

FIG. 14 is a flowchart illustrating a method 1400 for mitigating warping error of an MPI dataset. The MPI dataset includes N reference images of a scene each having D1 image-layers, each of the N reference images having been captured at a respective one of N camera locations. Method 1400 may be implemented within one or more aspects of warping-error mitigator 1300. In embodiments, method 1400 is implemented by processor 1386 executing computer-readable instructions of software 1320. Method 1400 includes steps 1410, 1440, 1460, and, in embodiments, also step 1210. Step 1410 includes steps 1420 and 1430 Step 1460 includes steps 1470 and 1480. Method 1400 may also include step 1210, introduced in the description of method 1200.

Step 1410 may be executed by implementing three iterative loops: an outer loop, a middle loop within the outer loop, and an inner loop within the middle loop. The outer Joop has N iterations, one for each camera locations of the N reference images. The middle loop, associated with step 1420, has (N−1) iterations, one for each of the N−1 reference images other than the camera of the outer-loop iteration. The inner loop, associated with step 1430, has D1 iterations, each corresponding to a respective image-layer of the reference images.

Step 1410 includes determining a plurality of warped images, N·$N_b$·D1 in number, by, for each of the N camera locations, executing step 1420. $N_b$ is a positive integer less than or equal to (N−1). For example, Step 1420 includes, for $N_b$ neighboring cameras location of the N camera locations other than the camera location, determining a respective sub-plurality of warped images by, for each image-layer of D1 image-layers of the MPI dataset, executing step 1430. In embodiments. $N_b$ equals eight, such that the $N_b$ neighboring camera locations are the four side-adjacent and four diagonal-adjacent neighboring camera locations relative to the camera location.

Step 1430 includes, for each image-layer of D1 image-layers of the MPI dataset, executing steps 1432 and 1434. Step 1432 includes determining a normalized reference image as an element-wise quotient of (i) of the reference image, of the N reference images, captured from the neighboring camera location and (ii) a disparity map of the reference image. An example of the disparity map is $$W_p^{(s \to t)}$$

of equation (5). In an example of step 1432, normalizer 1322 implements step (1a) of N_camera_post_warp_clean to determine normalized reference images 1332(1, 2, . . . , T), where T equals N(N−1)·D1.

Step 1434 includes warping the normalized reference image from the neighboring camera location to the camera location. In an example of step 1434, image warper 1323 implements step (1b) of N_camera_post_warp_clean to generate warped images 1333(1, 2, . . . . T) from the T normalized images 1332.

Step 1440 includes, for each of the N reference images, determining No weighted alpha-channel arrays. Each of the $N_b$ weighted alpha-channel arrays is equal to a contribution to the alpha-channel of the reference image to a respective one of the $N_b$ neighboring camera locations. In an example of step 1440, alpha-channel array generator 1324 executes step-2 of N_camera_post_warp_clean to determine (N−1) weighted alpha-channel arrays 1334.

Step 1460 includes, for each pixel location of a plurality of pixel locations of the MPI dataset, executing steps 1470 and 1480. Step 1470 includes determining a coefficient array that minimizes a total warping error contributed by each of the N reference images. The total warping error is a function of (i) the $N_b$ weighted alpha-channel arrays, (ii) D1 weighting-factors each evaluated at the pixel location, corresponding to a respective one of the D1 image-layers of one reference image of the N reference images, and derived from alpha-channels of the one reference image, (iii) the plurality of warped images, and (iv) a texture channel of each of the N reference images, each evaluated at the pixel location. In an example of step 1470, warping error minimizer 1326 implements step-3 of the function N_camera_post-_warp_clean to determine, for each pixel location of multiplane images 910, a respective coefficient array 1336 from weighting-factor array sets 1131, warped images 1333, and weighted alpha-channel arrays 1334.

Step 1480 includes, for each image-layer of the D1 image-layers of each of the N reference images, updating the value of the texture channel of the image-layer at the pixel location by: multiplying the value of the texture channel by the element of the coefficient array corresponding to the image-layer of the reference image. In an example of step 1480, texture-channel updater 1328 implements step-4 of the function N_camera_post_warp_clean to update, for each of image layers {0, 1, 2, . . . , (D1-1)} of each image 910, the value of the texture channel of the image-layer to respective texture channel value 1338(1, 2, . . . , N).

Changes may be made in the above methods and systems without departing from the scope of the present embodiments. It should thus be noted that the matter contained in the above description or shown in the accompanying drawings should be interpreted as illustrative and not in a limiting sense. Herein, and unless otherwise indicated, the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

Various aspects of the present invention may be appreciated from the following Enumerated Example Embodiments (EEEs):

EEE1. A method for merging layers of a multi-plane image (MPI), comprising:

determining a layer-weight array $\{\{a^{(s)}\}\}$ by, for each image-layer of D1 image-layers of the MPI each located at a respective one of D1 layer-depths, determining a respective one of D1 total weights as an element-wise sum of a weighting-factor array $\{\{W_p(x, y)\}\}$ of the image-layer;

interpolating the layer-weight array to yield an interpolated layer-weight signal $\{\{q^{(s)}(z)\}\}$;

partitioning the interpolated layer-weight signal into D2 segments to yield D2 optimized layer-depth intervals $\{\{$with edges $t_p.\}\}$. D2 being less than D1;

determining, for each optimized layer-depth interval, (i) a number of intra-interval layer-depths, of the D1 layer-depths, located within the optimized layer-depth interval; and (ii) a number of intra-interval layer weights, of the D1 total weights, each associated with a respective one of the number of intra-interval layer-depths; and determining, for each of the D2 optimized layer-depth intervals, a respective output layer-depth $\{\{d'\}\}$ as an average of the number of intra-interval layer-depths each weighted by a respective one of the number of intra-interval layer weights.

EEE2. The method of EEE1, further comprising, before determining the layer-weight array;

for each image-layer of the D1 image-layers, determining the weighting-factor array $\{\{W_p(x, y)\}\}$ of the image layer from (i) an alpha channel of the image-layer, and (ii) alpha channels of image-layers, of the D1 image-layers, having a layer-depth smaller than a layer-depth of the layer.

EEE3. The method of EEE2, determining the weighting-factor array comprising: determining, for each pixel coordinate of the layer, a respective pixel-wise weighting factor from (i) the value of the alpha channel at the pixel coordinate, and (ii) values of the alpha channels at the pixel coordinate.

EEE4. The method of any preceding EEE, partitioning comprising minimizing an objective function that includes a monotonically non-decreasing function of the interpolated layer-weight signal.

EEE5. The method of any preceding EEE, each pair of adjacent layer-depths of the D1 layer-depths being separated by a same initial distance, and partitioning comprising:

determining D2 weighted depths $\{\{r_p.\}\}$ by, for each of D2 layer-depth intervals each having a respective one of a plurality of lower-boundaries $\{\{t_p.\}\}$, determining a respective one of D2 weighted depths as an average of layer-depth values within the layer-depth interval weighted by values of the interpolated layer-weight signal within the layer-depth interval.

updating the D2 layer-depth intervals by, for each layer-depth interval of the D2 layer-depth intervals for which the initial distance is less than a difference between (i) an average R of the layer-depth interval's associated weighted depth and the subsequent weighted depth and (ii) the lower-boundary $\{\{t_p.\}\}$ of the layer-depth interval, changing the value of the lower boundary to equal the average R; and obtaining the D2 optimized layer-depth intervals by iterating said steps of determining D2 weighted depths and updating the D2 layer-depth intervals until the plurality of lower-boundaries converge to within a predetermined tolerance.

EEE6. The method of EEE5, further comprising, before any instances of determining, initializing the D2 layer-depth intervals such that each of the D2 layer-depth intervals has an equal length.

EEE7. The method of any preceding EEE, each of the number of intra-interval layer-depths being a layer-depth of a respective one of a number of intra-interval image layers, of the D1 image layers, each having a respective one of a number of intra-interval texture channels $$\{\{C_p^{(s)}$$

between pMin and pMax$\}\}$, and further determining, for each of the D2 optimized layer-depth intervals, a respective texture channel $$\{\{C_{p'}^{\prime(s)}\}\}$$

as an average of the number of intra-interval texture channels weighted by a respective one of the number of intra-interval layer weights.

EEE8. The method of any of EEE1 to EEE6, each of the number of intra-interval layer-depths being a layer-depth of a respective one of a number of intra-interval image layers, of the D1 image layers, each having a respective one of a number of intra-interval alpha channels $\{\{A_p$ between pMin and pMax$\}\}$, and further comprising:

determining, for each of the D2 optimized layer-depth intervals, a respective alpha channel $$\{\{A_{p'}^{\prime(s)}\}\}$$

as an average of the number of intra-interval alpha-channels weighted by a respective one of the number of intra-interval layer weights.

EEE9. A method for merging layers of N MPIs from N different camera poses of a scene, comprising:

determining N interpolated layer-weight signals $\{\{q^{(s)}(z)\}\}$ by, for each of the N MPIs, executing: (i) EEE1's step determining a layer-weight array $\{\{a^{(s)}\}\}$ and (ii) EEE1's step of interpolating the layer-weight array;

obtaining a global interpolated layer-weight signal $\{\{q(z)\}\}$ as a sum of each of the N interpolated layer-weight signals:

partitioning the global interpolated layer-weight signal into D2 segments to yield D2 globally-optimized layer-depth intervals $\{\{$with edges $t_p.\}\}$. D2 being less than D1;

determining, for each of the D2 globally-optimized layer-depth intervals, (i) a number of intra-interval layer-depths, of the D1 layer-depths, located within the optimized layer-depth interval; and (ii) a number of intra-interval layer weights, of the D1 total weights, each associated with a respective one of the number of intra-interval layer-depths; and determining for each of the D2 globally-optimized layer-depth intervals, a respective output layer-depth $\{\{d'\}\}$ as an average of the number of intra-interval layer-depths weighted by a respective one of the number of intra-interval layer weights.

EEE10. The method of EEE9, further comprising, for each of the N MPIs, determining a respective texture channel for each of the D2 optimized layer-depth intervals by executing the method of EEE7.

EEE11. The method of EEE9, further comprising, for each of the N MPIs, determining a respective alpha channel for each of the D2 optimized layer-depth intervals by executing the method of EEE8.

EEE12. A method for mitigating warping error of a multi-plane image (MPI) dataset that includes N reference images of a scene each having D1 image-layers, each of the N reference images having been captured at a respective one of N camera locations, the method comprising:

determining a plurality of warped images $$\{\{R_p^{(t\to s)}\}\},$$

$N \cdot N_b \cdot D1$ in number where $N_b \le (N-1)$, by, for each of the N camera locations $\{\{s\}\}$:

for $N_b$ neighboring camera locations of the N camera locations $\{\{t \in T_s\}\}$ other than the camera location $\{\{s\}\}$, determining a respective sub-plurality of warped images $$\{\{R_p^{(t\to s)}\}\}$$

by, for each image-layer of D1 image-layers of the MPI dataset:

determining a normalized reference image $$\{\{R_p^{(t)}\}\}$$

as an element-wise quotient of (i) of the reference image, of the N reference images, captured from the neighboring camera location and (ii) a disparity map $$\{\{W_p^{(s\to t)}\}\}$$

of the reference image, and warping the normalized reference image from the neighboring camera location to the camera location;

for each of the N reference images, determining $N_b$ weighted alpha-channel arrays $\{\{B^{(t\to s)}\}\}$, each of which is equal to a contribution to the alpha-channel of the reference image to a respective one of the $N_b$ neighboring camera locations;

for each pixel location of a plurality of pixel locations of the MPI dataset, determine a coefficient array $\{\{\beta\}\}$ that minimizes a total warping error contributed by each of the N reference images, the total warping error being a function of (i) the $N_b$ weighted alpha-channel arrays $\{\{B^{(t\to s)}\}\}$, (ii) D1 weighting-factors $$\{\{W_p^{(s)}(x, y)\}\}$$

each evaluated at the pixel location, corresponding to a respective one of the D1 image-layers of one reference image of the N reference images, and derived from alpha-channels of the one reference image, (iii) the plurality of warped images $$\{\{R_p^{(t\to s)}\}\},$$

and (iv) the texture channel $$\{\{C_p^{(s)}\}\}$$

of each of the N reference images, each evaluated at the pixel location; and for each image-layer of the D1 image-layers of each of the N reference images, update the value of the texture channel of the image-layer at the pixel location by: multiplying the value of the texture channel by the element of the coefficient array corresponding to the image-layer of the reference image.

EEE13. The method of EEE12, further comprising:

for each image-layer of the D1 image-layers of each of the N reference images.

determining a respective one of the D1 weighting factors $\{\{W_p(x, y)\}\}$ from (i) an alpha channel of the image-layer, and (ii) alpha channels of image-layers, of the D1 image-layers, having a layer-depth smaller than a layer-depth of the layer.

EEE14. The method of EEE12 or EEE13, in the step of determining a coefficient array, the coefficient array having N rows and D1 columns, such that the element in row j and column k of the coefficient array corresponds to the kth image-layer of the $j^{th}$ reference image, where j and k are positive integers less than or equal to N and D1, respectively.

EEE15. An image-layer merger comprising:

a processor; and a memory storing a multi-plane image (MPI) and machine readable instructions that, when executed by a processor, cause the processor to execute the method of any of EEE1 to EEE8.

EEE16. A warping-error mitigator comprising:

a processor; and a memory storing (i) a multi-plane image (MPI) dataset that includes N reference images of a scene each having D1 image-layers, each of the N reference images having been captured at a respective one of N camera locations and (ii) storing machine readable instructions that, when executed by a processor, cause the processor to execute the method of any of EEE12 to EEE14.

APPENDIX A

Notation

| Symbol | Description |
|---|---|
| Bold Face Upper Case | Indicates matrix |
| bold face lower case | Indicates vector |
| non-bold face lower case | Indicates scalar |
| W | Weighting factor of an MPI |
| A | Alpha channel of an MPI |
| C | Texture channel of an MPI |
| R | Reference RGB image |
| I | Rendered RGB image from and MPI |
| Ĩ | Synthesized RGB image from multiple rendered RGB images. |
| N | Number of cameras in a grid |
| D | Size of depth dimension of an MPI |
| H | Size of height dimension of MPI |
| W | Size of width dimension of MPI |
| Superscript (i) | Indicates MPI information associated with camera (i) at its original location |
| Superscript (i → t) | Indicates MPI information associated with camera (i) that has been warped to camera (t) |
| $p_s$ | Pose associated with camera/view s. |
| prime ' | Indicates layer-merged MPI information |
| ⊙ | Hadamard product |
| ∅ | Hadamard division |
| $B^{(s \to t)}$ | Normalized weight camera s contributes to a synthesized image at view t. |
| D | Number of layers in MPI: original |
| D' | Number of layers in MPI: after merging |
| $V_\tau$ | Set of |
| K | Camera model |
| $T_s$ | The set of all neighboring cameras of camera s |

What is claimed is:

1. A method for merging layers of a multi-plane image (MPI), comprising:
determining a layer-weight array $\{\{a^{(s)}\}\}$ by, for each image-layer of D1 image-layers of the MPI each located at a respective one of D1 layer-depths, determining a respective one of D1 total weights as an element-wise sum of a weighting-factor array $\{\{W_p(x, y)\}\}$ of the image-layer;
interpolating the layer-weight array to yield an interpolated layer-weight signal $\{\{q^{(s)}(z)\}\}$;
partitioning the interpolated layer-weight signal into D2 segments to yield D2 optimized layer-depth intervals $\{\{\text{with edges } t_{p'}\}\}$, D2 being less than D1;
determining, for each optimized layer-depth interval, (i) a number of intra-interval layer-depths, of the D1 layer-depths, located within the optimized layer-depth interval; and (ii) a number of intra-interval layer weights, of the D1 total weights, each associated with a respective one of the number of intra-interval layer-depths; and
determining, for each of the D2 optimized layer-depth intervals, a respective output layer-depth $\{\{d'\}\}$ as an average of the number of intra-interval layer-depths each weighted by a respective one of the number of intra-interval layer weights.

2. The method of claim 1, further comprising, before determining the layer-weight array:
for each image-layer of the D1 image-layers, determining the weighting-factor array $\{\{W_p(x, y)\}\}$ of the image layer from (i) an alpha channel of the image-layer, and (ii) alpha channels of image-layers, of the D1 image-layers, having a layer-depth smaller than a layer-depth of the layer.

3. The method of claim 2, determining the weighting-factor array comprising: determining, for each pixel coordinate of the layer, a respective pixel-wise weighting factor from (i) the value of the alpha channel at the pixel coordinate, and (ii) values of the alpha channels at the pixel coordinate.

4. The method of claim 1, partitioning comprising minimizing an objective function that includes a monotonically non-decreasing function of the interpolated layer-weight signal.

5. The method of claim 1, each pair of adjacent layer-depths of the D1 layer-depths being separated by a same initial distance, and partitioning comprising:
determining D2 weighted depths $\{\{r_{p'}\}\}$ by, for each of D2 layer-depth intervals each having a respective one of a plurality of lower-boundaries $\{\{t_{p'}\}\}$, determining a respective one of D2 weighted depths as an average of layer-depth values within the layer-depth interval weighted by values of the interpolated layer-weight signal within the layer-depth interval,
updating the D2 layer-depth intervals by, for each layer-depth interval of the D2 layer-depth intervals for which the initial distance is less than a difference between (i) an average R of the layer-depth interval's associated weighted depth and the subsequent weighted depth and (ii) the lower-boundary $\{\{t_{p'}\}\}$ of the layer-depth interval, changing the value of the lower boundary to equal the average R; and
obtaining the D2 optimized layer-depth intervals by iterating said steps of determining D2 weighted depths and updating the D2 layer-depth intervals until the plurality of lower-boundaries converge to within a predetermined tolerance.

6. The method of claim 5, further comprising, before any instances of determining, initializing the D2 layer-depth intervals such that each of the D2 layer-depth intervals has an equal length.

7. The method of claim 1, each of the number of intra-interval layer-depths being a layer-depth of a respective one of a number of intra-interval image layers, of the D1 image layers, each having a respective one of a number of intra-interval texture channels $$\{\{C_p^{(s)}$$

between pMin ana pMax}}, and further comprising:
determining, for each of the D2 optimized layer-depth intervals, a respective texture channel $$\{\{C_{p'}^{'(s)}\}\}$$

as an average of the number of intra-interval texture channels weighted by a respective one of the number of intra-interval layer weights.

8. The method of claim 1, each of the number of intra-interval layer-depths being a layer-depth of a respective one of a number of intra-interval image layers, of the D1 image layers, each having a respective one of a number of intra-interval alpha channels $\{\{A_p$ between pMin and pMax}}, and further comprising:
determining, for each of the D2 optimized layer-depth intervals, a respective alpha channel $$\{\{A_{p'}^{'(s)}\}\}$$

as an average of the number of intra-interval alpha-channels weighted by a respective one of the number of intra-interval layer weights.

9. A method for merging layers of N multi-plane images (MPIs) from N different camera poses of a scene, comprising:

determining N interpolated layer-weight signals $\{\{q^{(s)}(z)\}\}$ by, for each of the N MPIs:

determining a layer-weight array $\{a^{(s)}\}$ by, for each image-layer of D1 image-layers of the MPI each located at a respective one of D1 layer-depths, determining a respective one of D1 total weights as an element-wise sum of a weighting-factor array $\{\{W_p(x,y)\}\}$ of the image-layer; and interpolating the layer-weight array to yield an interpolated layer-weight signal $\{\{q^{(s)}(z)\}\}$;

obtaining a global interpolated layer-weight signal $\{\{q(z)\}\}$ as a sum of each of the N interpolated layer-weight signals;

partitioning the global interpolated layer-weight signal into D2 segments to yield D2 globally-optimized layer-depth intervals $\{\{$ with edges $t_{p'}\}\}$, D2 being less than D1;

determining, for each of the D2 globally-optimized layer-depth intervals, (i) a number of intra-interval layer-depths, of the D1 layer-depths, located within the optimized layer-depth interval; and (ii) a number of intra-interval layer weights, of the D1 total weights, each associated with a respective one of the number of intra-interval layer-depths; and determining for each of the D2 globally-optimized layer-depth intervals, a respective output layer-depth $\{\{d'\}\}$ as an average of the number of intra-interval layer-depths weighted by a respective one of the number of intra-interval layer weights.

10. The method of claim 9, further comprising, for each of the N MPIs, determining a respective texture channel for each of the D2 optimized layer-depth intervals as an average of the number of intra-interval texture channels weighted by a respective one of the number of intra-interval layer weights.

11. The method of claim 9, further comprising, for each of the N MPIs, determining a respective alpha channel for each of the D2 optimized layer-depth intervals as an average of the number of intra-interval alpha-channels weighted by a respective one of the number of intra-interval layer weights.

12. An image-layer merger comprising:

a processor; and a memory storing a multi-plane image (MPI) and machine readable instructions that, when executed by a processor, cause the processor to execute the method of claim 1.

* * * * *